United States Patent
Liao

(10) Patent No.: US 6,781,278 B2
(45) Date of Patent: Aug. 24, 2004

(54) ASSEMBLING TYPE STATOR STRUCTURE OF MOTOR

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 0 days.

(21) Appl. No.: 10/422,851

(22) Filed: Apr. 25, 2003

(65) Prior Publication Data

US 2004/0124734 A1 Jul. 1, 2004

(30) Foreign Application Priority Data

Dec. 27, 2002 (TW) .................................. 91137807 A

(51) Int. Cl.$^7$ ................................................ H02K 1/12
(52) U.S. Cl. ...................... 310/254; 310/179; 310/259
(58) Field of Search ...................... 310/254, 42, 259, 310/216, 217, 218, 179, 185, 184; 29/596

(56) References Cited

U.S. PATENT DOCUMENTS

| | | | | |
|---|---|---|---|---|
| 3,809,938 A | * | 5/1974 | Sjoberg et al. | 310/254 |
| 4,712,035 A | * | 12/1987 | Forbes et al. | 310/269 |
| 4,912,353 A | * | 3/1990 | Kondo et al. | 310/259 |
| 5,722,152 A | * | 3/1998 | Sumi et al. | 29/596 |
| 5,729,072 A | * | 3/1998 | Hirano et al. | 310/258 |
| 5,786,651 A | * | 7/1998 | Suzuki | 310/259 |
| 6,225,725 B1 | * | 5/2001 | Itoh et al. | 310/254 |
| 6,313,557 B1 | * | 11/2001 | De Filippis et al. | 310/216 |
| 6,404,095 B1 | * | 6/2002 | Hsu | 310/254 |
| 6,448,685 B1 | * | 9/2002 | Mayer et al. | 310/254 |
| 6,452,303 B1 | * | 9/2002 | Marioni | 310/254 |
| 6,472,783 B1 | * | 10/2002 | Witthohn et al. | 310/68 R |
| 6,504,284 B1 | * | 1/2003 | Kazama et al. | 310/259 |
| 6,515,397 B1 | * | 2/2003 | Schmid | 310/217 |
| 6,550,130 B2 | * | 4/2003 | Itoh et al. | 29/596 |

FOREIGN PATENT DOCUMENTS

| | | | | |
|---|---|---|---|---|
| JP | 02155449 | * | 6/1990 | H02K/15/02 |
| JP | 02254947 | * | 10/1990 | H02K/15/02 |

* cited by examiner

Primary Examiner—Dang Le
Assistant Examiner—Heba Elkassabgi
(74) Attorney, Agent, or Firm—Troxell Law Office PLLC

(57) ABSTRACT

An assembling type stator structure of motor includes a main body (52) of the stator having a plurality of scoop channels (53) and a plurality of disassembled radial toothlets (54) that are punched and stacked up by a plurality of silicon steel sheets. The configuration and size of the toothlets (54) are such that they can be fitted into the matching scoop channels (53). The toothlets (54) are connected to the main body (52) of stator to assemble into an assembled stator by employing of the following four methods: single positioning pin, double positioning pins, single groove-and-tongue, as well as double groove-and tongue.

6 Claims, 36 Drawing Sheets

STEP 3

STEP 1

STEP 2

STEP 4

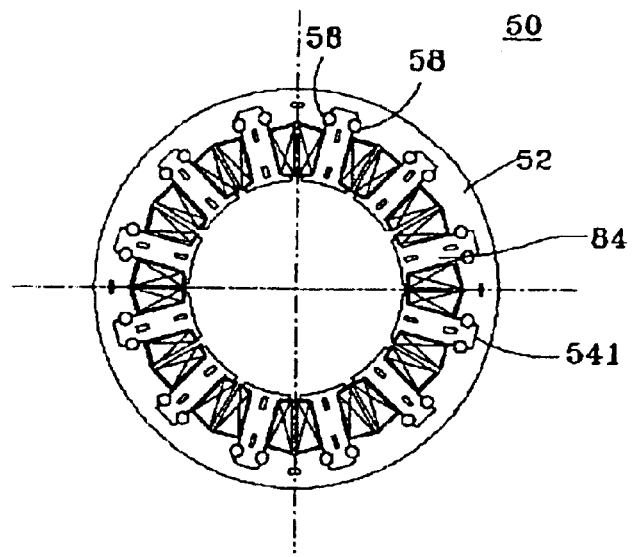
FIG. 5-1
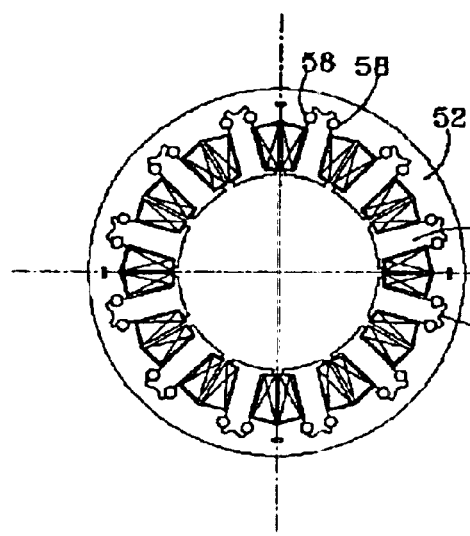 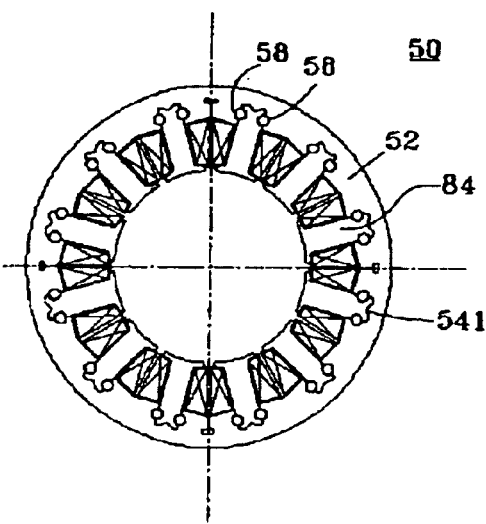
FIG. 5-1A　　　　　　　FIG. 5-1B

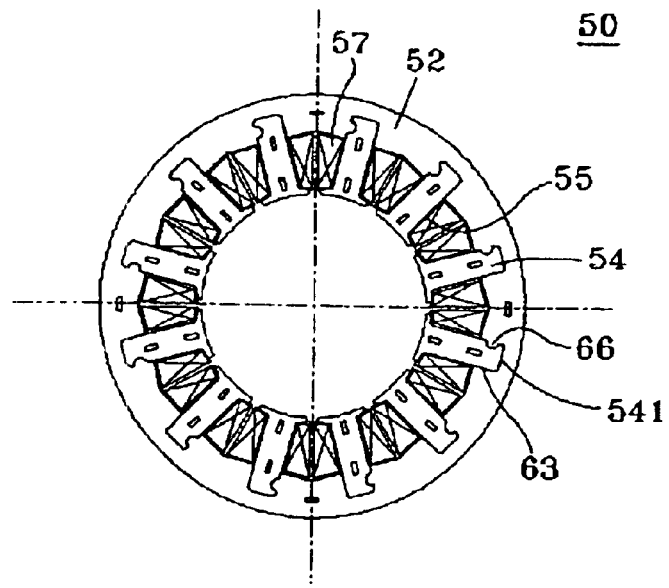
FIG. 5-2
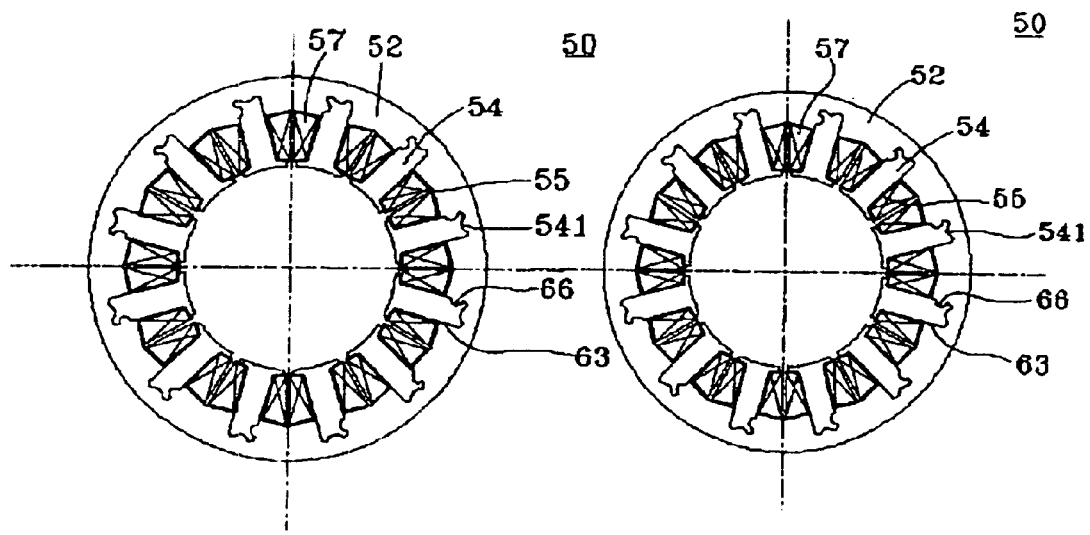
FIG. 5-2A  FIG. 5-2B

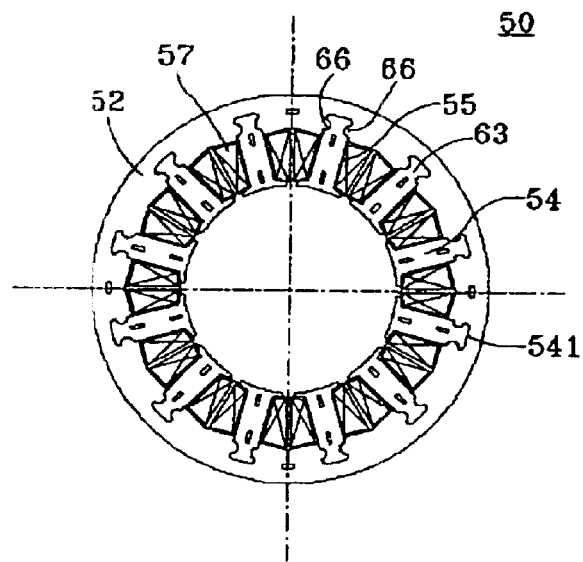
FIG. 5-3
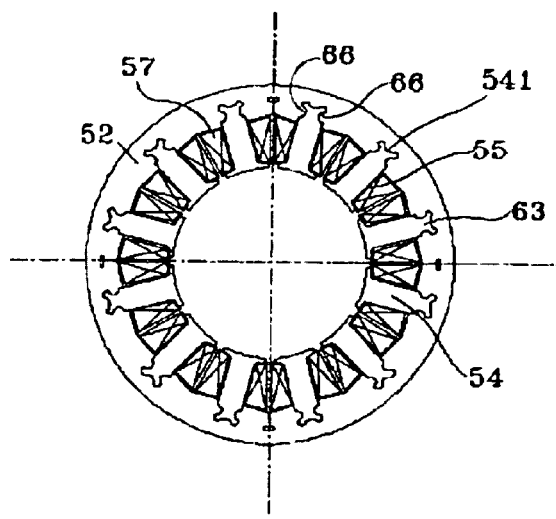 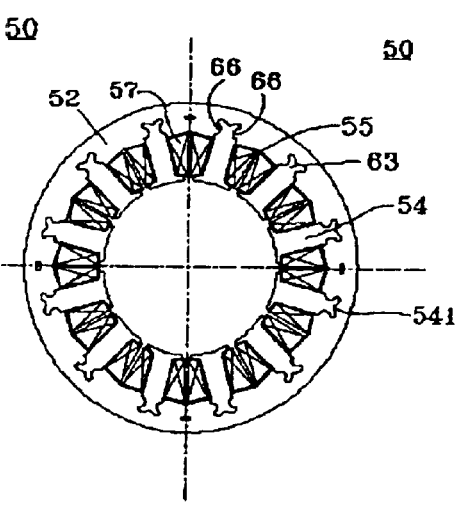
FIG. 5-3A         FIG. 5-3B

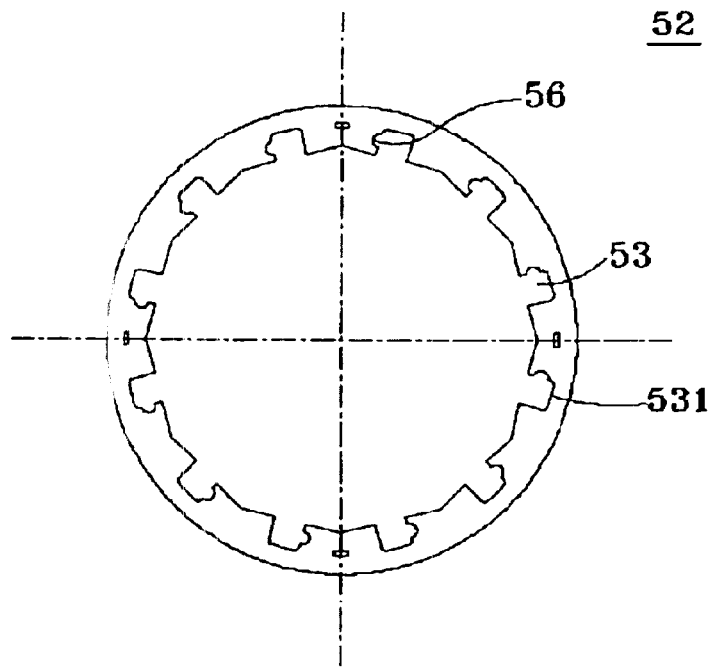
FIG. 6A
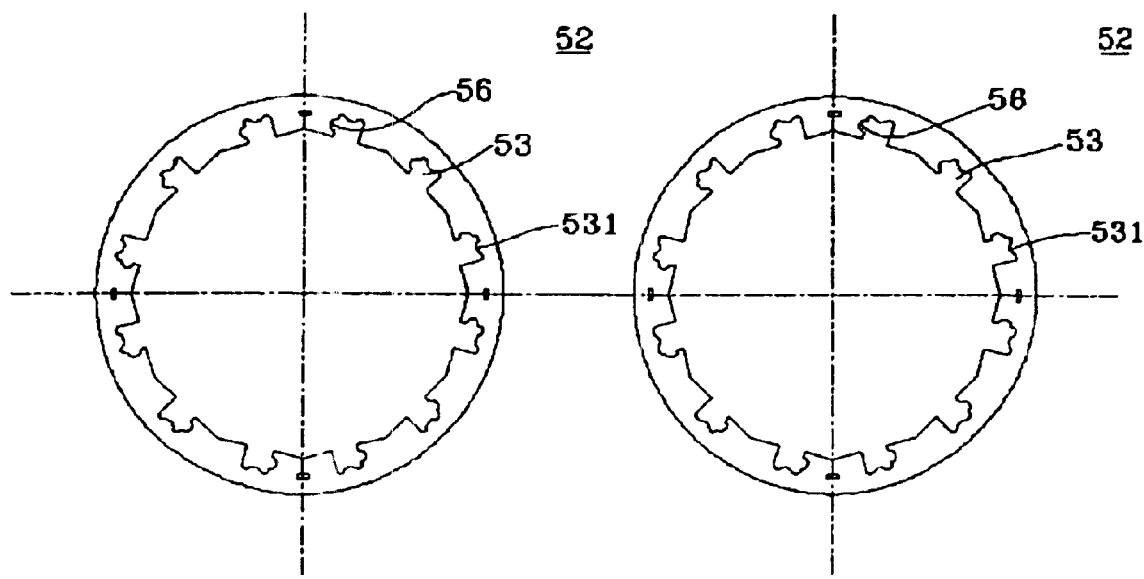
FIG. 6AA  FIG. 6AB

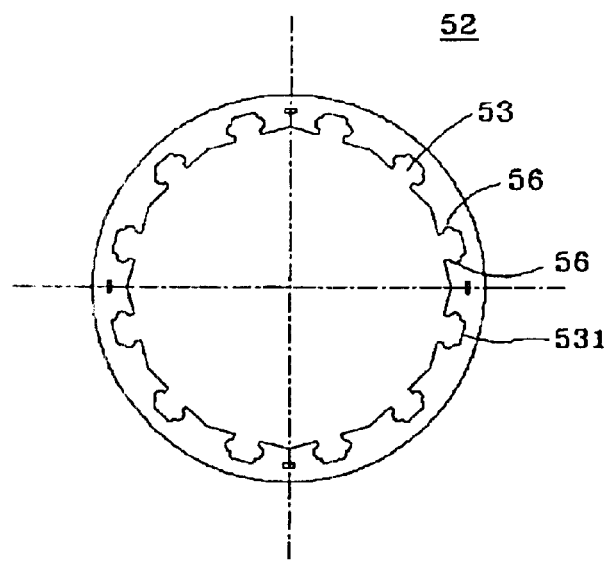
FIG. 6A-1
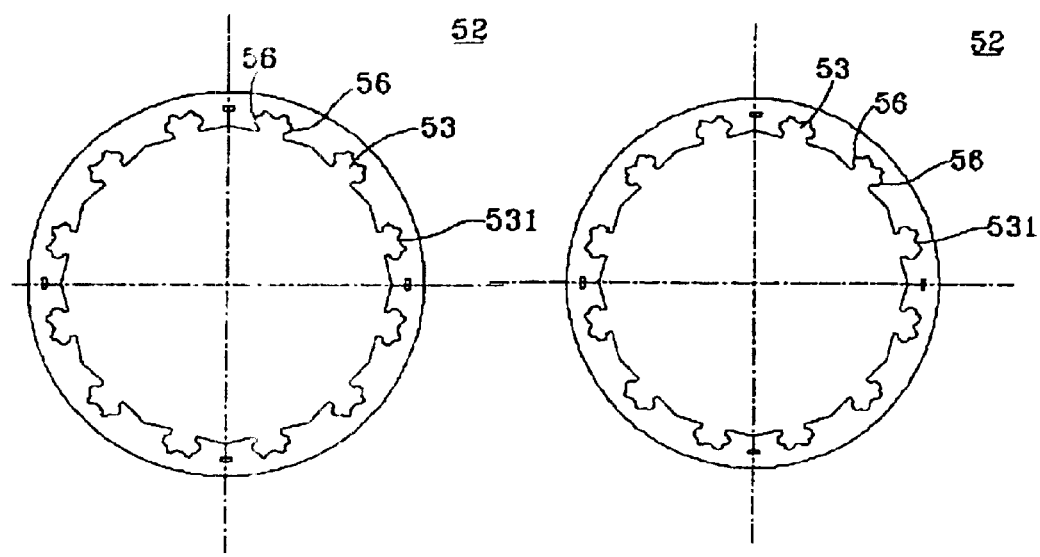
FIG. 6A-1A  FIG. 6A-1B

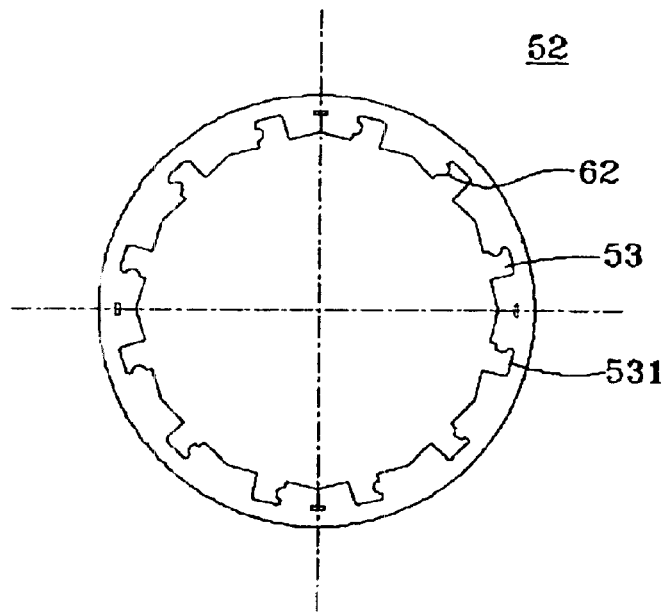
FIG. 6A-2
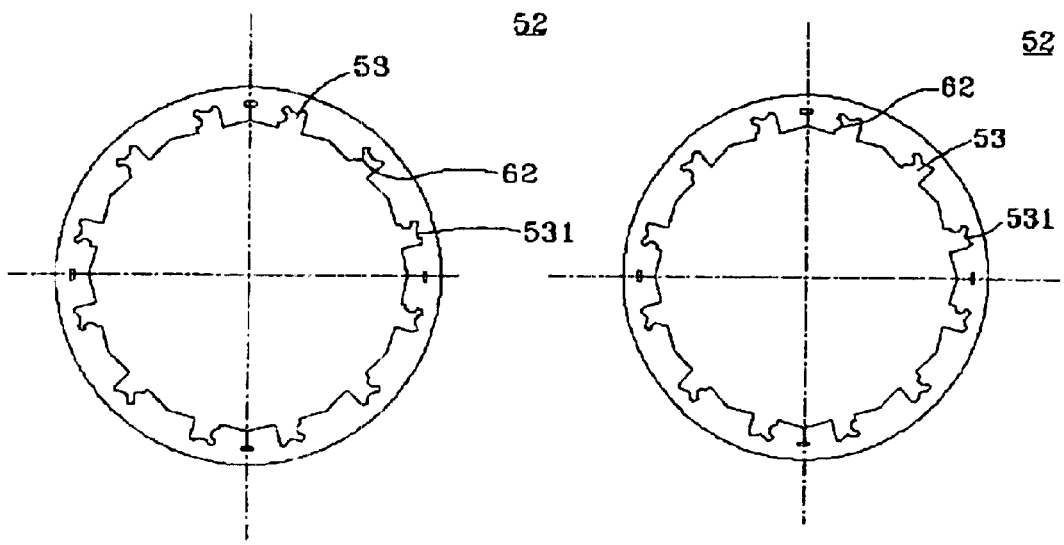
FIG. 6A-2A  FIG 6A-2B

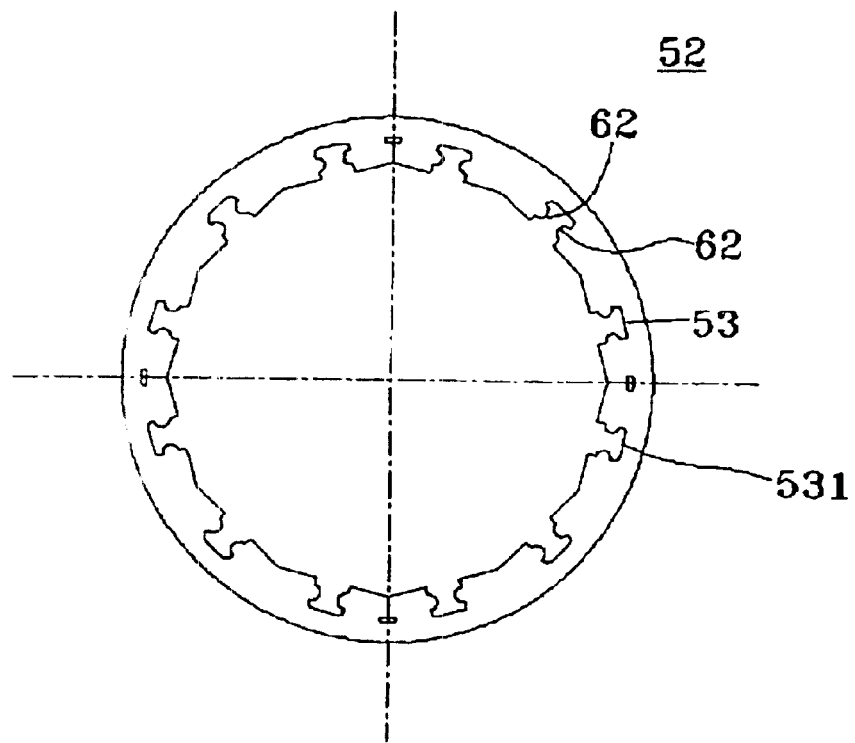
FIG. 6A-3
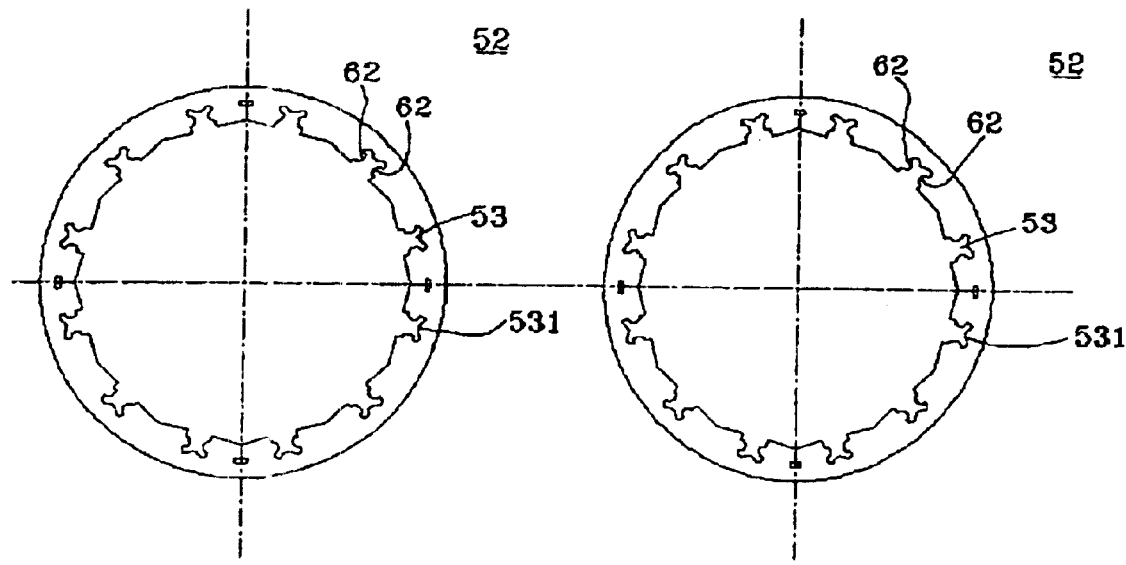
FIG. 6A-3A  FIG. 6A-3B

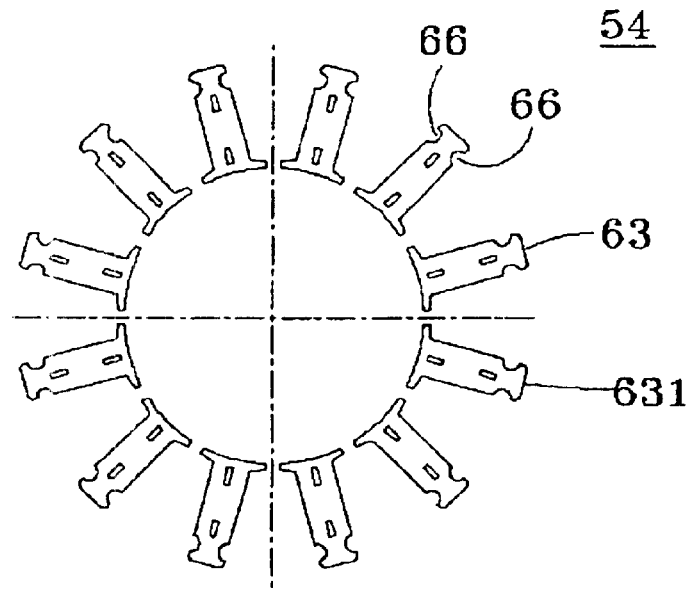
FIG. 6B-1
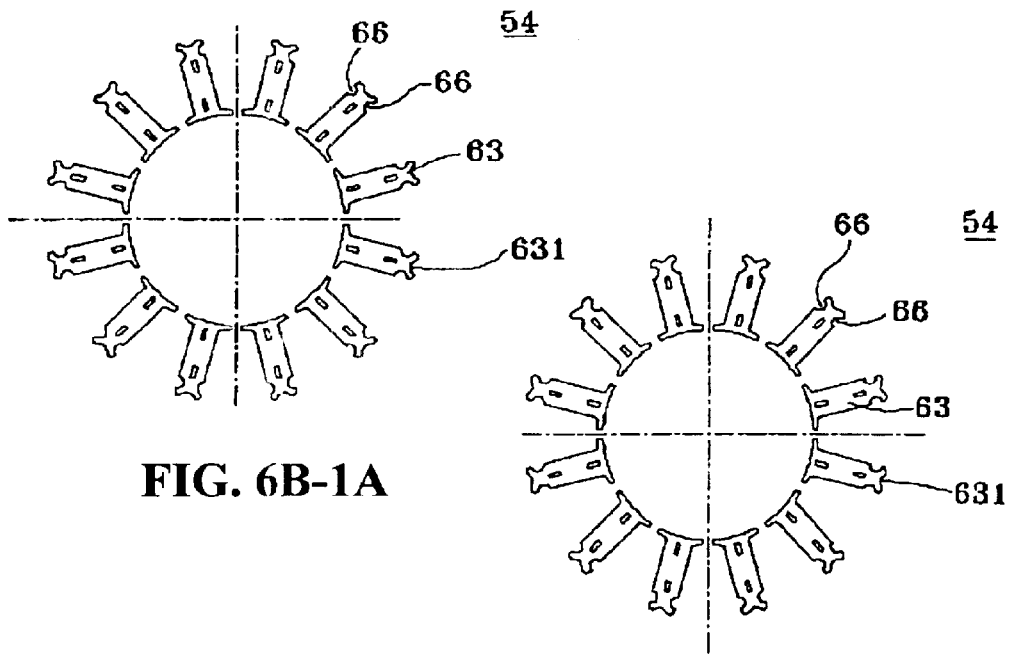
FIG. 6B-1A
FIG. 6B-1B

STEP 1
STEP 2
STEP 3
STEP 4

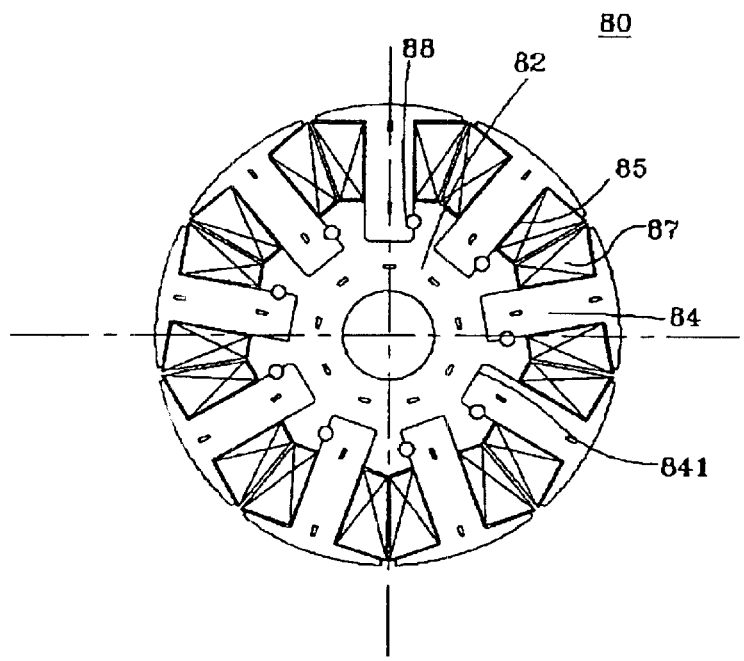
FIG. 8
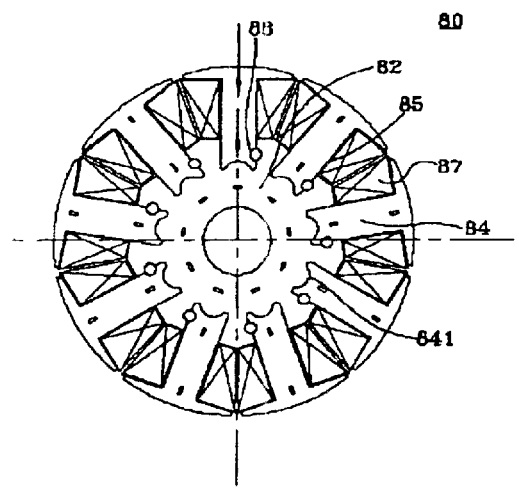 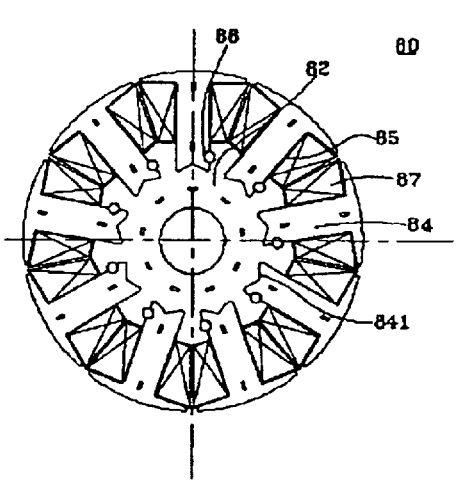
FIG. 8AA  FIG. 8BB

STEP 1

STEP 2

STEP 3

STEP 4

STEP 1

STEP 2

STEP 3

STEP 4

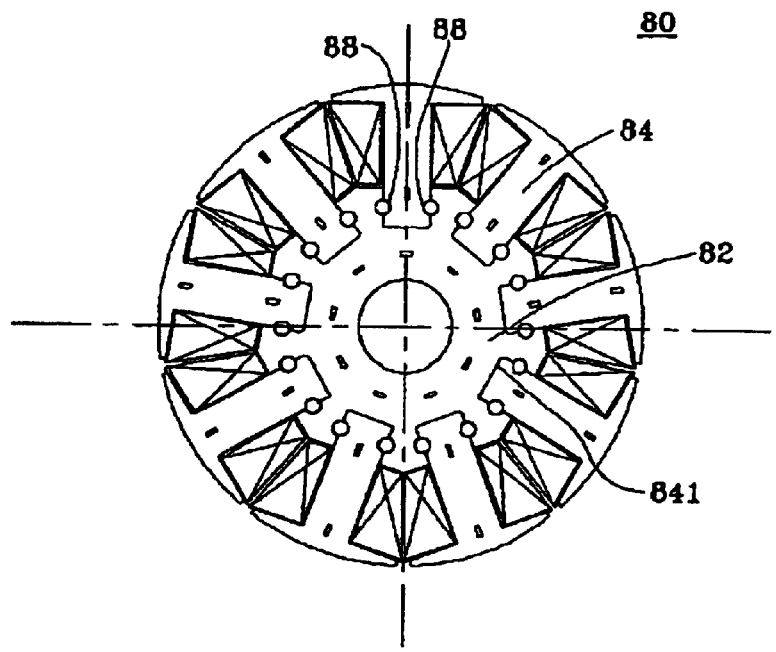
FIG. 8-1
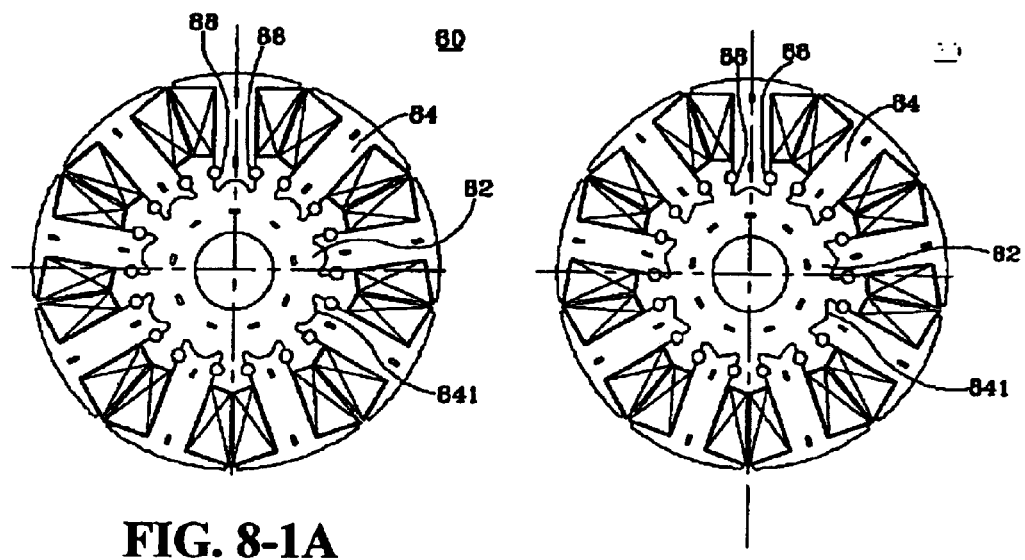
FIG. 8-1A
FIG. 8-1B

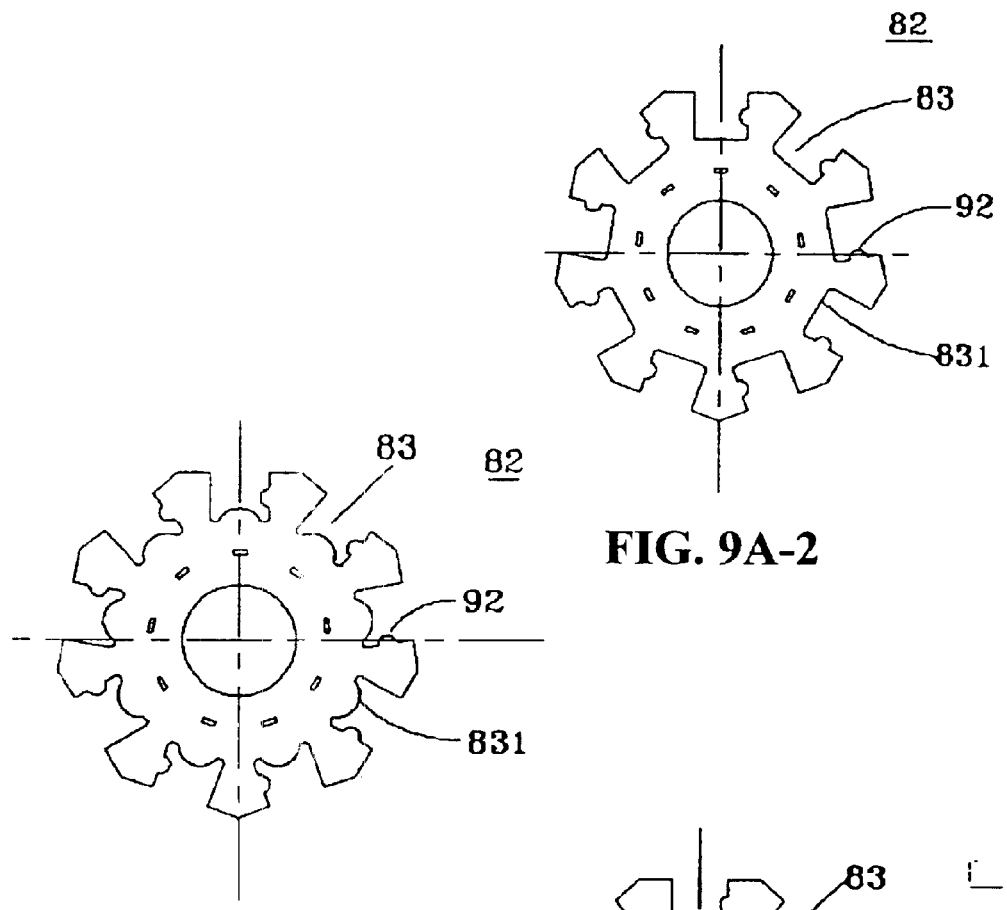
FIG. 9A-2
FIG. 9A-2A
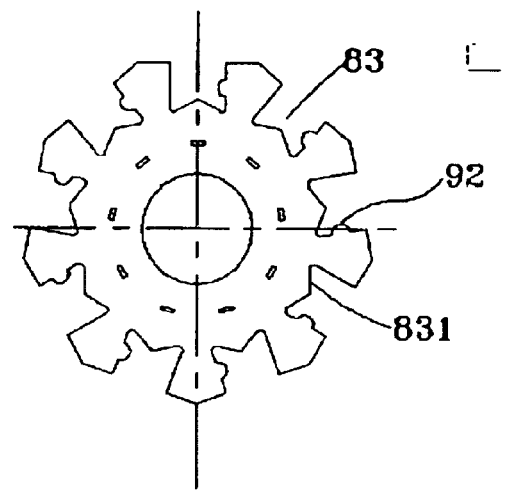
FIG. 9A-2B

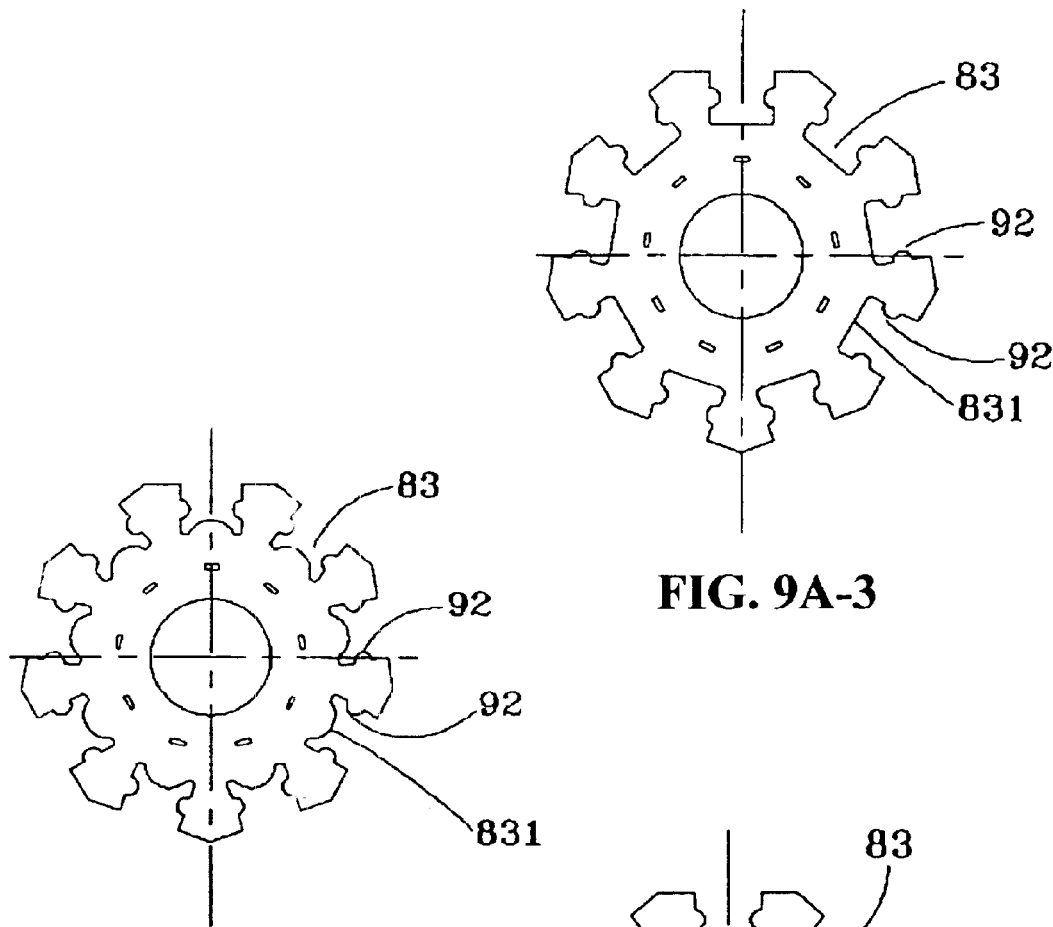
FIG. 9A-3
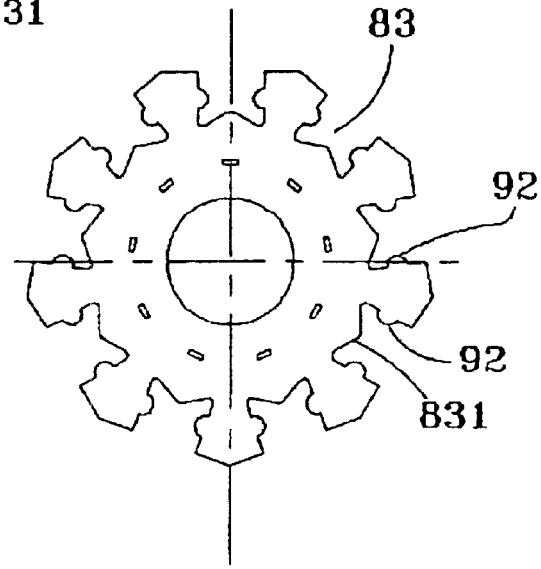
FIG. 9A-3A
FIG. 9A-3B

ASSEMBLING TYPE STATOR STRUCTURE OF MOTOR

FIELD OF THE INVENTION

The invention relates to an assembling type stator structure of motors, and more particularly, to an assembling type stator structure that provides the flexibility of being able to be assembled or disassembled in either axial or radial direction.

BACKGROUND OF THE INVENTION

FIG. 1 is a schematic cross-sectional view of a stator structure of outer stator/inner rotor brushless motors of the prior art. The stator structure includes an outer stator 10, an inner rotor (not show), a main body of the outer stator 12, a tooth part 14, a plurality of bobbins 15, and a plurality of coils 17. FIG. 2 is a schematic cross-sectional view of another stator structure of the inner stator/outer rotor brushless motors of the prior art. The stator structure includes an inner stator 20, an outer rotor (not shown), an inner main body of the stator 22, a tooth part 24, a plurality of bobbins 25, and a plurality of coils 27. As shown in FIG. 1 and FIG. 2, wire winding, whether it is stacked winding or single tooth winding, of the stators 10 and 20 of the prior art of brushless motors has the disadvantage of being unable to effectively increase the occupying rate of winding. This is due to the restriction of the geometric shape of the stator. Especially, the custom-made winding machine for the stator 10 of an outer stator/inner rotor brushless motors of the prior art shown in FIG. 1 is very expensive because of its complicated actions of its mechanism. Hence, as shown in FIG. 3 and FIG. 4, there are improved outer stator/inner rotor and inner stator/outer rotor brushless motors provided of the prior art. FIG. 3 is a cross-sectional schematic view of the stator structure of outer stator/inner rotor brushless motors of the prior art. As shown in FIG. 3, the stator structure of outer stator/inner rotor brushless motors of the prior art includes an outer stator 30, a main body 32, a plurality of tooth parts 34, a plurality of dove-tailed scoop channels 36, a plurality of bobbins 35, and a plurality of coils 37. FIG. 4 is a schematic cross-sectional view of the stator structure of the inner stator/outer rotor brushless motor of the prior art. As shown in FIG. 4, the stator structure of the inner stator/outer rotor brushless motor of the prior art includes an inner stator 40, an inner main body of the stator 42, a plurality of toothlets 44, a plurality of dove-tailed scoop channel 46, a plurality of bobbins 45 and a plurality of coils 47. The assembly procedure of the brushless motors shown in FIG. 3 and FIG. 4 is done by disassembling the stator into the main body of the stator and a plurality of toothlets, then completing the winding on the bobbin and placing the toothlets therein first. Afterward, the toothlets and the main body of the stator are assembled by use of dove-tailed scoop channel. FIG. 3-1 is a schematic view showing the assembling steps of the improved outer stator/inner rotor brushless motor of the prior art. Although the improved brushless motors shown in FIG. 3 and FIG. 4 have the advantages of reducing the winding cost, increasing the occupation rate of winding, and increasing the efficiency of the motor, the assembling work by use of dove-tailed scoop channel for these improved brushless motors must be done and only be done in axial direction as shown in FIG. 3-1. Nevertheless, assembling in axial direction still has some degree of difficulty. Moreover, the assembling method by use of dove-tailed scoop channel can cause serious stress concentration due to sharp angle at the corner of the dove-tailed scoop channel which will make the dove-tailed scoop channel be subject to generate fracture.

The assembling type of the outer stator motor of the prior art of U.S. Pat. No. 6,265,804 as shown in FIG. 11 has the disadvantage of being unable to increase the occupation rate of winding with single tooth winding although it has achieved the purpose of saving material.

The assembling type outer stator motor of the prior art of U.S. Pat. No. 5,786,651 can achieve the purpose of saving material, increase the occupation rate of winding with single tooth winding, and eliminate the requirement of being assembled in axial direction. Nevertheless, it lacks of self-lock function, has to be fixed by the housing of the motor, has indirect heat dissipation only, and requires the outer stator components be winded together on the winding machine.

FIG. 13 is a schematic cross-sectional view of a shunt outer stator brush motor of the prior art. The custom-made winding machine for single tooth winding is very expensive due to the requirement of complicated actions of mechanical operation.

The foregoing statements are the disadvantages of the outer stator/inner rotor brushless motor of the prior art.

SUMMARY OF THE INVENTION

In light of the disadvantages of the prior art, the invention provides an assembling type stator structure of motors that aim to ameliorate at least some of the disadvantages of the prior art or to provide a useful alternative. The stator structure of motors of embodiments of the invention can increase the occupation rate of winding and reduce the winding cost. This is done by providing more convenient and flexible assembly methods in either axial direction or radial direction by use of positioning pins in comparison with the assembly of the prior art by use of dove-tailed scoop channel which can only assemble in axial direction. In addition, all of the assembling methods provided by the invention have no corner in acute angle; therefore, there is no fracture problem due to stress concentration.

Therefore, the object of embodiments of the invention is to provide an assembling type stator structure of motors that is assembled by inserting and fitting a plurality of disassembled radial toothlets into a plurality of scoop channels of the main body of the stator.

Another object of embodiments of the invention is to provide an assembling type stator structure of motors that is assembled by connecting a plurality of disassembled radial toothlets to the main body of the stator by use of single positioning pin or double positioning pins.

Another object of embodiments of the invention is to provide an assembling type stator structure of motors that is assembled by connecting a plurality of disassembled radial toothlets to the main body of the stator by use of single groove-and-tongue or double groove-and-tongue.

Another object of embodiments of the invention is to provide an assembling type outer stator structure for shunt motors that is assembled by connecting the disassembled main body of the outer stator and the disassembled toothlets together. This is done by use of either single positioning pin, or double positioning pins, or single groove-and-tongue, or double groove-and-tongue.

In one broad form, the invention provides an assembling type stator structure of motors that includes a plurality of scoop channels and a plurality of disassembled radial toothlets. The disassembled radial toothlets are constructed by punching and stacking up a plurality of permeable silicon steel sheets. Each of the toothlets has configuration and size matching those of the scoop channels so that the toothlet can be inserted and tightly fitted into the scoop channel. Then, the assembling type stator can be assembled with one of the following four methods: single positioning pin, double positioning pin, single groove-and-tongue, and double groove-and-tongue.

Unless the context clearly requires otherwise, throughout the description and the claims the words 'comprise', 'comprising', and the like are to be construed in an inclusive sense as opposed to an exclusive or exhaustive sense; that is to say, in the sense of "including, but not limited to".

In order to understand fully the objectives, characteristics, and the efficacy of the invention in the preferred embodiment, a detailed illustration with accompanied drawing is described as follows:

BRIEF DESCRIPTION OF THE DRAWING

FIG. 3-1 is a schematic isometric view showing the assembling steps for the improved outer stator/inner rotor brushless motors of the prior art that is connected by use of dove-tailed scoop channel.

FIG. 5-1 is a schematic cross-sectional view of outer stator/inner rotor brushless motors of the invention that is assembled by use of double positioning pins connecting method.

FIG. 5-1A is a schematic cross-sectional view of outer stator/inner rotor brushless motors of the invention that is assembled by use of double positioning pin connecting method wherein the shape of the inner stator/outer rotor brushless motor of the rectangular dedendum of the radial toothlet is changed from linear shape to a circular-arc-shape recess.

FIG. 5-1B is a schematic cross-sectional view of outer stator/inner rotor brushless motors of the invention that is assembled by use of double positioning pin connecting method wherein the shape of the inner stator/outer rotor brushless motor of the rectangular dedendum of the radial toothlet is changed from linear shape to a V-shape recess.

FIG. 5-2 is a schematic cross-sectional view of outer stator/inner rotor brushless motors of the invention that is assembled by use of single groove-and-tongue connecting method.

FIG. 5-2A is a schematic cross-sectional view of outer stator/inner rotor brushless motors of the invention that is assembled by use of single groove-and-tongue connecting method wherein the shape of the rectangular dedendum of the radial toothlet is changed from linear shape to a circular-arc-shape recess.

FIG. 5-2B is a schematic cross-sectional view of outer stator/inner rotor brushless motors of the invention that is assembled by use of single groove-and-tongue connecting method wherein the shape of the rectangular dedendum of the radial toothlet is changed from linear shape to a V-shape recess.

FIG. 5-3 is a schematic cross-sectional view of outer stator/inner rotor brushless motors of the invention that is assembled by use of double groove-and-tongue connecting method.

FIG. 5-3A is a schematic cross-sectional view of outer stator/inner rotor brushless motors of the invention that is assembled by use of double groove-and-tongue connecting method wherein the shape of the rectangular dedendum of the radial toothlet is changed from linear shape to a circular-arc-shape recess.

FIG. 5-3B is a schematic cross-sectional view of outer stator/inner rotor brushless motors of the invention that is assembled by use of double groove-and-tongue connecting method wherein the shape of the rectangular dedendum of the radial toothlet is changed from linear shape to a V-shape recess.

FIG. 6A is a schematic cross-sectional view of the main body of the stator 52 of the outer stator/inner rotor brushless motors of the invention that is assembled by use of single positioning pin connecting method.

FIG. 6AA is a schematic cross-sectional view of the main body of the stator 52 of the outer stator/inner rotor brushless motors of the invention that is assembled by use of single positioning pin connecting method wherein the contact surface to the dedendum of the radial toothlet is changed from linear shape to a circular-arc-shape recess.

FIG. 6AB is a schematic cross-sectional view of outer stator/inner rotor brushless motors of the invention that is assembled by use of single positioning pin connecting method wherein the contact surface to the rectangular dedendum of the radial toothlet is changed from linear shape to a V-shape recess.

FIG. 6A-1 is a schematic cross-sectional view of the main body 52 of the outer stator/inner rotor brushless motors of the invention that is assembled by use of double positioning pins connecting method.

FIG. 6A-1A is a schematic cross-sectional view of the main body 52 of the outer stator/inner rotor brushless motors of the invention that is assembled by use of double positioning pins connecting method wherein the contact surface to the rectangular dedendum of the radial toothlet is changed from linear shape to a circular-arc-shape recess.

FIG. 6A-1B is a schematic cross-sectional view of the main body 52 of the outer stator/inner rotor brushless motors of the invention that is assembled by use of double positioning pins connecting method wherein the contact surface to the rectangular dedendum of the radial toothlet is changed from linear shape to a V-shape recess.

FIG. 6A-2 is a schematic cross-sectional view of the main body 52 of the outer stator/inner rotor brushless motors of the invention that is assembled by use of single groove-and-tongue connecting method.

FIG. 6A-2A is a schematic cross-sectional view of the main body 52 of the outer stator/inner rotor brushless motors of the invention that is assembled by use of single groove-and-tongue connecting method wherein the contact surface to the rectangular dedendum of the radial toothlet is changed from linear shape to a circular-arc-shape recess.

FIG. 6A-2B is a schematic cross-sectional view of the main body 52 of the outer stator/inner rotor brushless motors of the invention that is assembled by use of single groove-and-tongue connecting method wherein the contact surface to the rectangular dedendum of the radial toothlet is changed from linear shape to a V-shape recess.

FIG. 6A-3 is a schematic cross-sectional view of the main body 52 of the outer stator/inner rotor brushless motors of the invention that is assembled by use of double groove-and-tongue connecting method.

FIG. 6A-3A is a schematic cross-sectional view of the main body 52 of the outer stator/inner rotor brushless motors of the invention that is assembled by use of double groove-and-tongue connecting method wherein the contact surface to the rectangular dedendum of the radial toothlet is changed from linear shape to a circular-arc-shape recess.

FIG. 6A-3B is a schematic cross-sectional view of the main body 52 of the outer stator/inner rotor brushless motors of the invention that is assembled by use of double groove-and-tongue connecting method wherein the contact surface to the rectangular dedendum of the radial toothlet is changed from linear shape to a V-shape recess.

FIG. 6BA is a schematic cross-sectional view of the rectangular dedendum of a plurality of disassembled radial toothlets 54 of the invention applied in outer stator/inner rotor brushless motors assembled by use of single positioning pin connecting method wherein the contact surface to the main body of the stator is changed from linear shape to a circular-arc-shape recess.

FIG. 6BB is a schematic cross-sectional view of the rectangular dedendum of a plurality of disassembled radial toothlets 54 of the invention applied in outer stator/inner rotor brushless motors assembled by use of single positioning pin connecting method wherein the contact surface to the main body of the stator is changed from linear shape to a V-shape recess.

FIG. 6B-1 is a schematic cross-sectional view of a layout of a plurality of disassembled radial toothlets 54 of the invention applied in outer stator/inner rotor brushless motors assembled by use of double positioning pins connecting method.

FIG. 6B-1A is a schematic cross-sectional view of the rectangular dedendum of a plurality of disassembled radial toothlets 54 of the invention applied in outer stator/inner rotor brushless motors assembled by use of double positioning pins connecting method wherein the contact surface to the main body of the stator is changed from linear shape to a circular-arc-shape recess.

FIG. 6B-1B is a schematic cross-sectional view of a plurality of disassembled radial toothlet 54 of the invention applied in outer stator/inner rotor brushless motors assembled by use of double positioning pins connecting method wherein the contact surface to the main body of the stator is changed from linear shape to a V-shape recess.

FIG. 7-2 is an schematic isometric view of the invention showing the assembling steps for the outer stator/inner rotor brushless motors by use of single groove-and-tongue connecting method.

FIG. 8-1 is a schematic cross-sectional view of the inner stator/outer rotor brushless motors of the invention assembled by use of double positioning pins connecting method.

FIG. 8-1A is a schematic cross-sectional view of the inner stator/outer rotor brushless motors of the invention assembled by use of double positioning pins connecting method wherein the shape of the inner stator/outer rotor brushless motor of the rectangular dedendum of the radial toothlet is changed from linear shape to a circular-arc-shape recess.

FIG. 8-1B is a schematic cross-sectional view of the inner stator/outer rotor brushless motors of the invention assembled by use of double positioning pins connecting method wherein the shape of the inner stator/outer rotor brushless motor of the rectangular dedendum of the radial toothlet is changed from linear shape to a V-shape recess.

FIG. 8-2 is a schematic cross-sectional view of the inner stator/outer rotor brushless motors of the invention assembled by use of single groove-and-tongue connecting method.

FIG. 8-2A is a schematic cross-sectional view of the inner stator/outer rotor brushless motors of the invention assembled by use of single groove-and-tongue connecting method wherein the shape of the inner stator/outer rotor brushless motor of the rectangular dedendum of the radial toothlet is changed from linear shape to a circular-arc-shape recess.

FIG. 8-2B is a schematic cross-sectional view of the inner stator/outer rotor brushless motors of the invention assembled by use of single groove-and-tongue connecting method wherein the shape of the inner stator/outer rotor brushless motor of the rectangular dedendum of the radial toothlet is changed from linear shape to a V-shape recess.

FIG. 8-3 is a schematic cross-sectional view of the inner stator/outer rotor brushless motors of the invention assembled by use of double groove-and-tongue connecting method.

FIG. 8-3A is a schematic cross-sectional view of the inner stator/outer rotor brushless motors of the invention assembled by use of double groove-and-tongue connecting method wherein the shape of the inner stator/outer rotor brushless motor of the rectangular dedendum of the radial toothlet is changed from linear shape to a circular-arc-shape recess.

FIG. 8-3B is a schematic cross-sectional view of the inner stator/outer rotor brushless motors of the invention assembled by use of double groove-and-tongue connecting method wherein the shape of the inner stator/outer rotor brushless motor of the rectangular dedendum of the radial toothlet is changed from linear shape to a V-shape recess.

FIG. 8A is a schematic isometric view showing the assembling steps of the inner stator/outer rotor brushless motors of the invention assembled by use of single positioning pin connecting method.

FIG. 8B is a schematic isometric view showing the assembling steps of the inner stator/outer rotor brushless motors assembled by use of single groove-and-tongue connecting method.

FIG. 9AA is a schematic cross-sectional view of the main body 82 of the inner stator/outer rotor brushless motors of the invention assembled by use of single positioning pin connecting method wherein the contact surface to the rectangular dedendum of the radial toothlet is changed from linear shape to a circular-arc-shape recess.

FIG. 9AB is a schematic cross-sectional view of the main body 82 of the inner stator of the inner stator/outer rotor brushless motors of the invention assembled by use of single positioning pin connecting method wherein the shape of the rectangular dedendum of the disassembled radial toothlet is changed from linear shape to a V-shape recess.

FIG. 9A-1 is a schematic cross-sectional view of the inner main body of the stator 82 of the invention applied in inner stator/outer rotor brushless motors assembled by use of double positioning pin connecting method.

FIG. 9A-1A is a schematic cross-sectional view of the main body 82 of the inner stator of the inner stator/outer rotor brushless motors of the invention assembled by use of single positioning pin connecting method wherein the shape of the rectangular dedendum of the disassembled radial toothlet is changed from linear shape to a circular-arc-shape recess.

FIG. 9A-1B is a schematic cross-sectional view of the main body 82 of the inner stator of the inner stator/outer rotor brushless motors of the invention assembled by use of single positioning pin connecting method wherein the shape of the rectangular dedendum of the disassembled radial toothlet is changed from linear shape to a V-shape recess.

FIG. 9A-2 is a schematic cross-sectional view of the main body 82 of the inner stator/outer rotor brushless motors of the invention assembled by use of single groove-and-tongue connecting method.

FIG. 9A-2A is a schematic cross-sectional view of the main body 82 of the inner stator/outer rotor brushless motors of the invention assembled by use of single groove-and-tongue connecting method wherein the contact surface to the rectangular dedendum of the radial toothlet is changed from linear shape to a circular-arc-shape recess.

FIG. 9A-2B is a schematic cross-sectional view of the main body 82 of the inner stator/outer rotor brushless motors of the invention assembled by use of single groove-and-tongue connecting method wherein the contact surface to the rectangular dedendum of the radial toothlet is changed from linear shape to a V-shape recess.

FIG. 9A-3 is a schematic cross-sectional view of the main body 82 of the inner stator/outer rotor brushless motors of the invention assembled by use of double groove-and-tongue connecting method.

FIG. 9A-3A is a schematic cross-sectional view of the main body 82 of the inner stator/outer rotor brushless motors of the invention assembled by use of double groove-and-tongue connecting method wherein the contact surface to the rectangular dedendum of the radial toothlet is changed from linear shape to a circular-arc-shape recess.

FIG. 9A-3B is a schematic cross-sectional view of the main body 82 of the inner stator/outer rotor brushless motors of the invention assembled by use of double groove-and-tongue connecting method wherein the contact surface to the rectangular dedendum of the radial toothlet is changed from linear shape to a V-shape recess.

FIG. 9BA is a schematic cross-sectional view of the main body 84 of the inner stator/outer rotor brushless motors of the invention assembled by use of single positioning pin connecting method wherein the contact surface to the rectangular dedendum of the radial toothlet is changed from linear shape to a circular-arc-shape recess.

FIG. 9BB is a schematic cross-sectional view of the main body 84 of the inner stator of the inner stator/outer rotor brushless motors of the invention assembled by use of single positioning pin connecting method wherein the shape of the rectangular dedendum of the disassembled radial toothlet is changed from linear shape to a V-shape recess.

FIG. 9B-1 is a schematic cross-sectional view of the main body 84 of the inner stator/outer rotor brushless motors of the invention assembled by use of double positioning pin connecting method.

FIG. 9B-1A is a schematic cross-sectional view of the main body 84 of the inner stator of the inner stator/outer rotor brushless motors of the invention assembled by use of single positioning pin connecting method wherein the shape of the rectangular dedendum of the disassembled radial toothlet is changed from linear shape to a circular-arc-shape recess.

FIG. 9B-1B is a schematic cross-sectional view of the main body 84 of the inner stator of the inner stator/outer rotor brushless motors of the invention assembled by use of single positioning pin connecting method wherein the shape of the rectangular dedendum of the disassembled radial toothlet is changed from linear shape to a V-shape recess.

FIG. 14-1 is a schematic cross-sectional view of the assembling type dipole outer stator shunt brush motor of the invention, in which the main body of the outer stator is assembled by use of single positioning pin, and the dedendum of the radial toothlet is connected to the main body of the stator by use of double positioning pins.

FIG. 14-2 is a schematic cross-sectional view of the assembling type dipole outer stator shunt brush motor of the invention, in which the main body of the outer stator is assembled by use of single semi-circular groove-and-tongue, and the dedendum of the radial toothlet is connected to the main body of the stator by use of double positioning pins.

FIG. 14-3 is a schematic cross-sectional view of the assembling type dipole outer stator shunt brush motor of the invention, in which the main body of the stator is not disassembled, and the dedendum of the radial toothlet is connected to the main body of the stator by use of double semi-circular groove-and-tongue.

FIG. 14-4 is a schematic cross-sectional view of the assembling type dipole outer stator shunt brush motor of the invention, in which the main body of the outer stator is assembled by use of single positioning pin, and the dedendum of the radial toothlet is connected to the main body of the stator by use of double semi-circular groove-and-tongue.

FIG. 14-5 is a schematic cross-sectional view of the assembling type dipole outer stator shunt brush motor of the invention, in which the main body of the outer stator is assembled by use of single semi-circular groove-and-tongue, and the dedendum of the radial toothlet is connected to the main body of the stator by use of double semi-circular groove-and-tongue.

FIG. 15-1 is a schematic cross-sectional view of the assembling type quadri-pole outer stator shunt brush motor of the invention, in which the main body of the outer stator is assembled by use of single positioning pin, and the dedendum of the radial toothlet is connected to the main body of the stator by use of double positioning pins.

FIG. 15-2 is a schematic cross-sectional view of the assembling type quadri-pole outer stator shunt brush motor of the invention, in which the main body of the outer stator is assembled by use of single semi-circular groove-and-tongue, and the dedendum of the radial toothlet is connected to the main body of the stator by use of double positioning pins.

FIG. 15-3 is a schematic cross-sectional view of the assembling type quadri-pole outer stator shunt brush motor of the invention, in which the main body of the stator is not disassembled, and the dedendum of the radial toothlet is connected to the main body of the stator by use of double semi-circular groove-and-tongue.

FIG. 15-4 is a schematic cross-sectional view of the assembling type quadri-pole outer stator shunt brush motor of the invention, in which the main body of the outer stator is assembled by use of single positioning pin, and the dedendum of the radial toothlet is connected to the main body of the stator by use of double semi-circular groove-and-tongue.

FIG. 15-5 is a schematic cross-sectional view of the assembling type quadri-pole outer stator shunt brush motor of the invention, in which the main body of the outer stator is assembled by use of single semi-circular groove-and-tongue, and the dedendum of the radial toothlet is connected to the main body of the stator by use of double semi-circular groove-and-tongue.

DETAILED DESCRIPTION OF THE EMBODIMENTS

Outer Stator/Inner Rotor Brushless Motor

Figure 5:
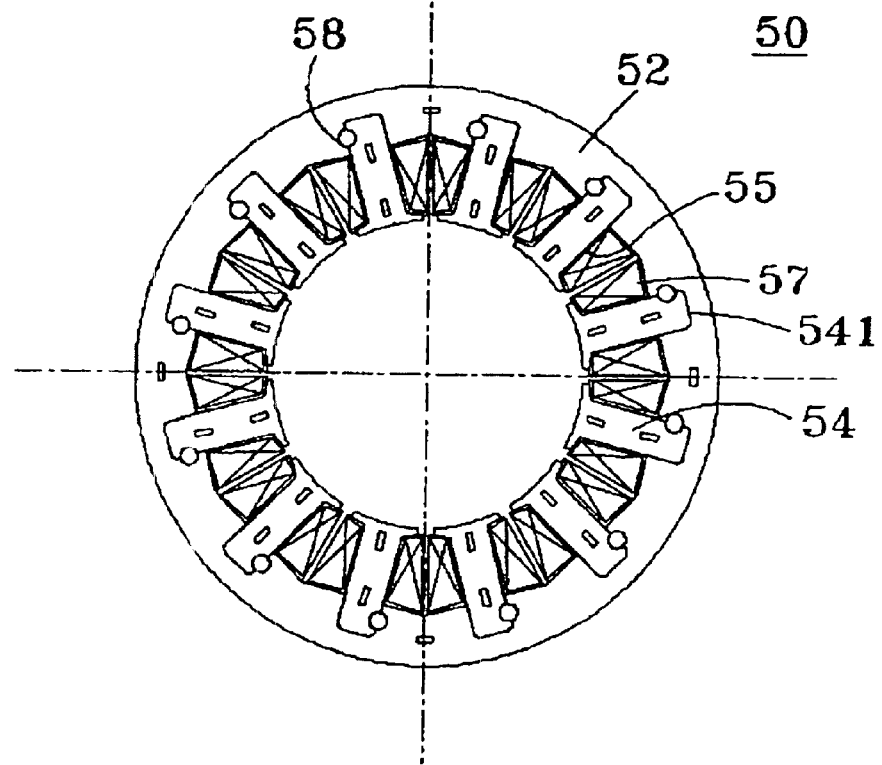
FIG. 5 is a schematic cross-sectional view of outer stator/inner rotor brushless motors of the invention that is assembled by use of single positioning pin connecting method.
Figure 6B:
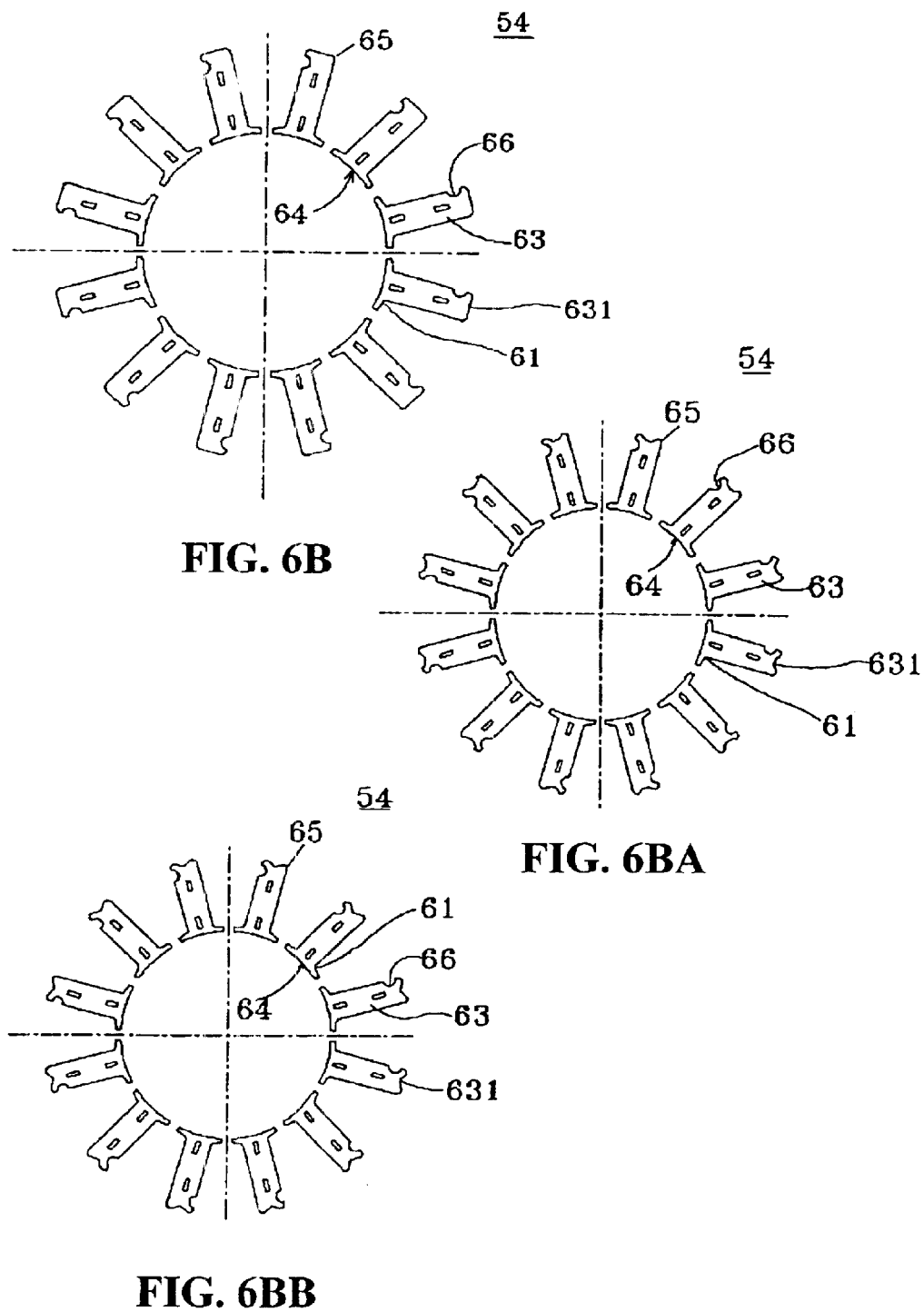
FIG. 6B is a schematic cross-sectional view of a layout of a plurality of disassembled radial toothlets 54 of the invention applied in outer stator/inner rotor brushless motors assembled by use of single positioning pin connecting method.

FIG. 5 is a schematic cross-sectional view of the invention applied in outer stator/inner rotor brushless motors by use of single positioning pin connecting method. As shown in FIG. 5, the outer stator/inner rotor brushless motor of the invention includes an outer stator 50 and an inner rotor (not shown in FIG. 5). The outer stator 50 includes a main body of the outer stator 52, a plurality of toothlets 54, a plurality of positioning pins 72 (refer to FIG. 7), a plurality of bobbins 55, and a plurality of coils 57. FIG. 6A is a schematic cross-sectional view of the main body of the outer stator 52 of the invention applied in outer stator/inner rotor brushless motors. FIG. 6B is a cross-sectional configuration view of a plurality of the disassembled radial toothlets applied in outer stator/inner rotor brushless motors. As shown in FIG. 6A and FIG. 6B, a number of a plurality of scoop channels 53 is evenly disposed on the internal side of the main body of the outer stator 52 according to number of the toothlets of the stator for housing a plurality of toothlets 54 with the same number. A plurality of toothlets 54 thereof is disassembled according to the actually required number of the toothlets of the motor's outer stator 12 of the prior art shown in FIG. 1. As shown in FIG. 6B, each of a plurality of toothlets 54 includes a addendum 61 and a rectangular dedendum 63. The toothlet is constructed by punching and stacking up a plurality of permeable silicon steel sheets (refer to FIG. 7). The end surface 64 of the addendum 61 is a circular arc surface, and an applicable air gap (not shown in FIG. 7) is kept from its corresponding rotor (not shown in FIG. 7). The dedendum 63 of each toothlet 54 has the configuration and size matching those of the scoop channel 53 so that the toothlet can be inserted and tightly fitted into the scoop channel 53. Each of two corners of the rectangular dedendum 63 has a chamfer 65 to facilitate the insertion of the toothlet into the main body of the stator 52.

The dedendum 63 of each disassembled radial toothlet 54 is inserted to the scoop channel 53 and both are connected together by use of a single positioning pin to construct the assembling type outer stator/inner rotor motor. As shown in FIG. 6A, one internal side of each scoop channel 53 has a semi-circular recess 56; correspondingly, one side of the dedendum 63 of each disassembled radial toothlet 54 also has a corresponding semi-circular recess 66. The position of the semi-circular recess 66 is such that it will correspond to the semi-circular recess 56 on the internal side of the scoop channel 53 when the dedendum 63 of each toothlet 54 is inserted and tightly fitted into the scoop channel 53; as a result, an assembly hole 58 is formed between one side of the scoop channel 53 and the corresponding side of the dedendum 63 of the toothlet 54. On the other hand, a plurality of bobbins 55 made of insulated material is used to be slipped on a plurality of toothlets 54 for winding.

Figure 7:
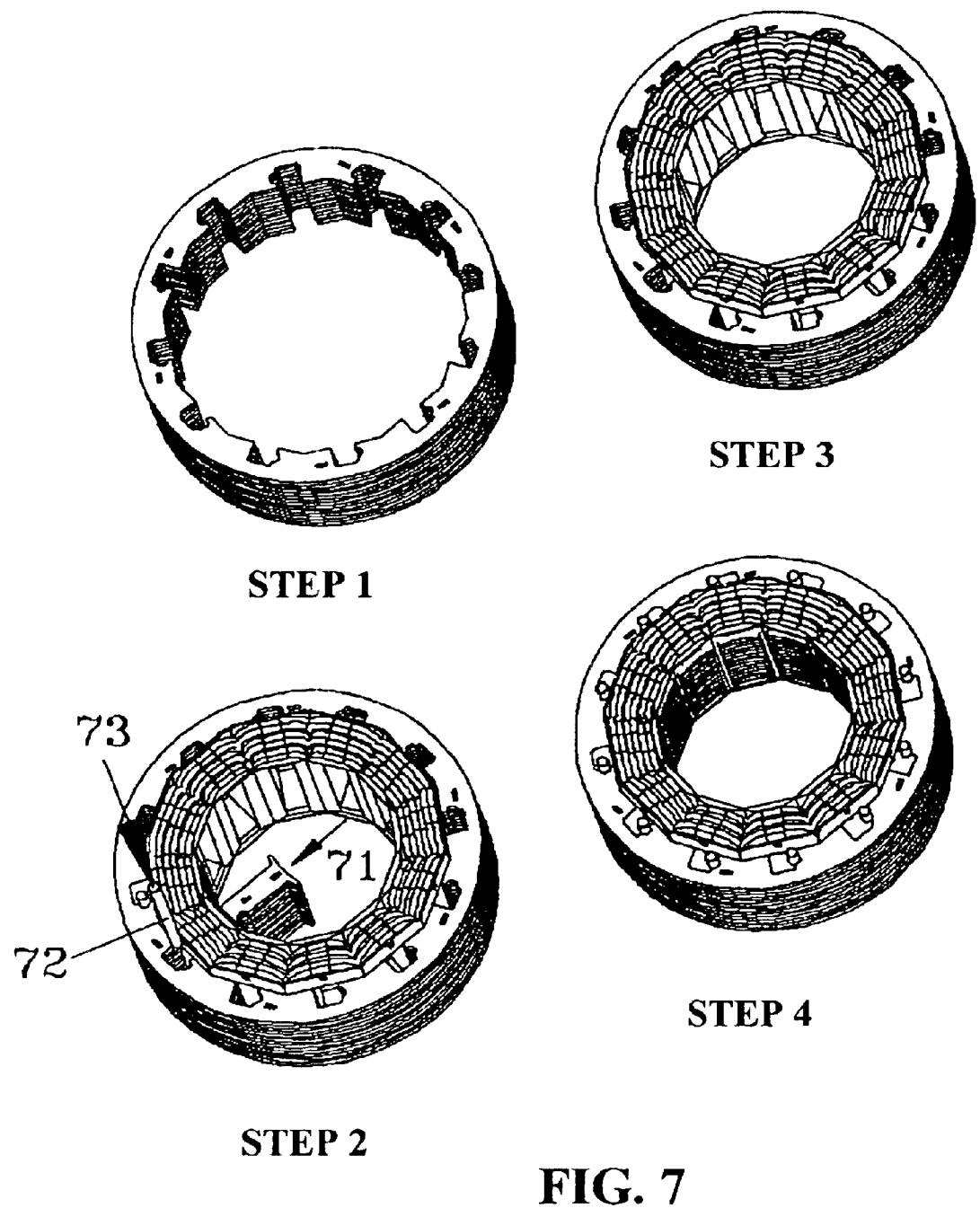
FIG. 7 is an schematic isometric view of the invention showing the assembling steps for the outer stator/inner rotor brushless motors by use of single positioning pin connecting method.
Figures 2, 7:
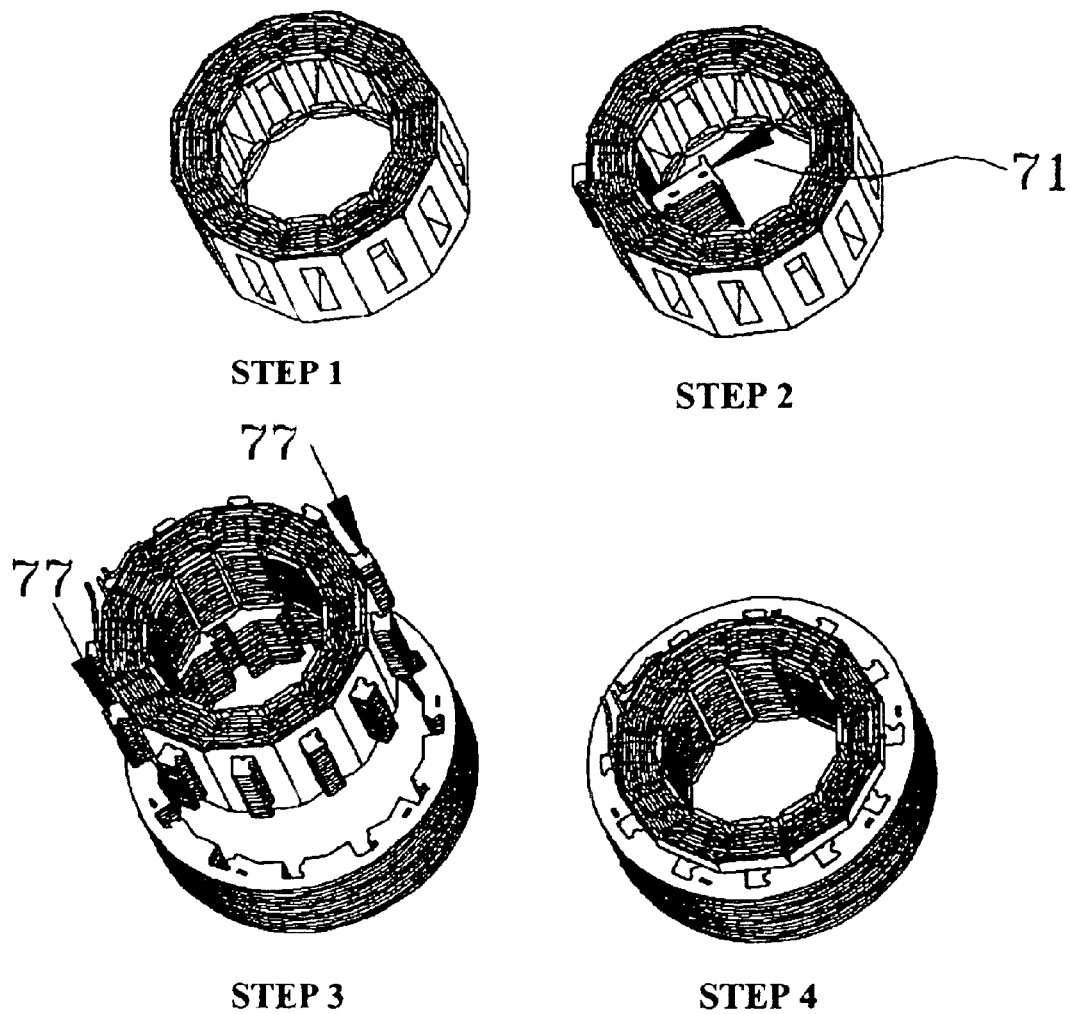

FIG. 7 is a isometric diagram for the assembly procedure of the outer stator/inner rotor brushless motors. As shown in FIG. 7, the stator of the motor is assembled in the following four steps. Step 1: appropriately place the constructed main body of the stator 52 of the outer stator/inner rotor motor; Step 2: place a plurality of coils 57 that has completed winding on the bobbin 55 at an appropriate position inside the main body of the outer stator 52; Step 3: insert one single toothlet 54 after the other into the scoop channel 53 of the main body of the outer stator 52 in radial direction starting from the center of the axis outward as the pointed direction of arrow head 71; thereafter, knock the positioning pin 72 into the corresponding circular assembly hole 58 one by one in the direction pointed by arrow head 73; Step 4: lastly, complete the assembly of the stator of outer stator/inner rotor motor. Since the assembling is in radial direction, and there is a chamfer 65 is at each corner of each dedendum 63, the assembly procedure is relatively easier and faster as comparing with the assembly procedure of the prior art shown in FIG. 3-1 that strictly requires the assembling be done in axial direction by use of dove-tailed scoop channel. Moreover, the invention increases the occupation rate of winding in single toothlet winding, and one needs only to place the bobbin on the winding machine to wind simultaneously. A more important feature is that when it comes to assembling, every toothlet can be easily assembled one by one in radial direction starting from the center of the axis, then fixed with positioning pin, and because of the self-locking capability, no extra component is required for fixation.

The assembly of the assembling type outer stator/inner rotor motors is accomplished by the following four connecting methods: single positioning pin, double positioning pin, single groove-and-tongue, and double groove-and-tongue.

The connecting method for the stator structure by use of single positioning pin has been described previously. As for the connecting method with double positioning pins for the stator structure, it can be referred to FIG. 5-1, FIG. 6A-1, and FIG. 6B-1 which are corresponding to FIG. 5, FIG. 6A, and FIG. 6B respectively. As shown in FIG. 5-1, FIG. 6A-1, and FIG. 6B-1, each of the two internal sides of scoop channel 53 on the main body of the outer stator 52 has a semi-circular recess 56 (refer to FIG. 6A-1); correspondingly, each of the two sides of the dedendum 63 of each disassembled radial toothlet 54 also has a semi-circular recess 66 (refer to FIG. 6B-1). The position of the two semi-circular recesses 66 are such that they will correspond to two semi-circular recesses 56 on the two internal sides of the scoop channel 53 when the dedendum 63 of each toothlet 54 is inserted and tightly fitted into the scoop channel 53. As a result, two assembly holes 58 (refer to FIG. 5-1) are formed between the two sides of the scoop channel 53 and their corresponding sides of the dedendum 63 of the toothlet 54. The assembly procedure is the same as the one shown in FIG. 7 except that it requires two positioning pins for the toothlet 54. The rest of the assembly procedure are the same as the single positioning pin method and shall not be repeated here.

Figure 2:
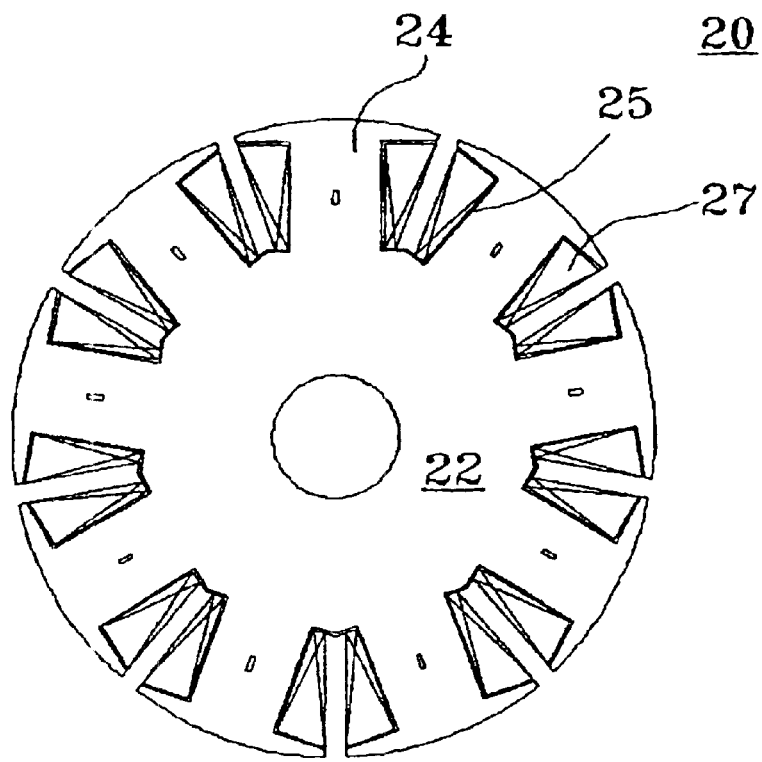
FIG. 2 is a schematic cross-sectional view of the stator structure of the inner stator/outer rotor brushless motors of the prior art.

Corresponding to FIG. 5, FIG. 6A, and FIG. 7 respectively, FIG. 5-2, FIG. 6A-2, and FIG. 7-2 show the connecting method of the stator structure by use of single groove-and-tongue. As shown in FIG. 5-2 and FIG. 6A-2, one internal side of each scoop channel 53 on the main body of the outer stator 52 (refer to FIG. 6A-2) has a semi-circular protuberance 62; correspondingly, one side of each dedendum 63 of the disassembled radial toothlet 54 (refer to FIG. 5-2) has a semi-circular recess 66. The position of the protuberance and the concave are such that when the dedendum 63 of each toothlet 54 is inserted and tightly fitted into each scoop channel 53, the semi-circular recess 66 on the toothlet 54 and the semi-circular protuberance 62 inside the scoop channel 53 are engaged each other. FIG. 7-2 is a isometric view of the invention applied in outer stator/inner rotor brushless motors that is assembled by use of single groove-and-tongue connecting method wherein the assembling procedure is described below with reference to FIG. 7-2. Step 1: appropriately place a plurality of coils 57 that has completed winding on the bobbin 55. Step 2: insert one single toothlet 54 after the other into the bobbin 55 in radial direction starting from the center of the axis outward in the direction pointed by arrow head 71. Step 3: fit the coil 57 with inserted toothlets 54 into the scoop channel 53 inside the main body of the outer stator 52 of the outer stator 50 in axial direction in the direction indicated by arrow head 77, so that the semi-circular recess 66 on the toothlet 54 and the semi-circular protuberance 62 inside the scoop channel 53 are engaged each other. Step 4: complete the assembly of the stator of outer stator/inner rotor motor as the last step. This design is more applicable for motors of lower stacking ratio of silicon steel sheets because as when it comes to assembling the outer stator 50, each toothlet 54 must be inserted into the bobbin 55 that has completed winding and then be inserted into the main body of the outer stator 52 in axial direction together. Otherwise, wire connection can be complicated if the toothlet 54 is inserted into the main body of the outer stator 52 one by one.

Figure 3:
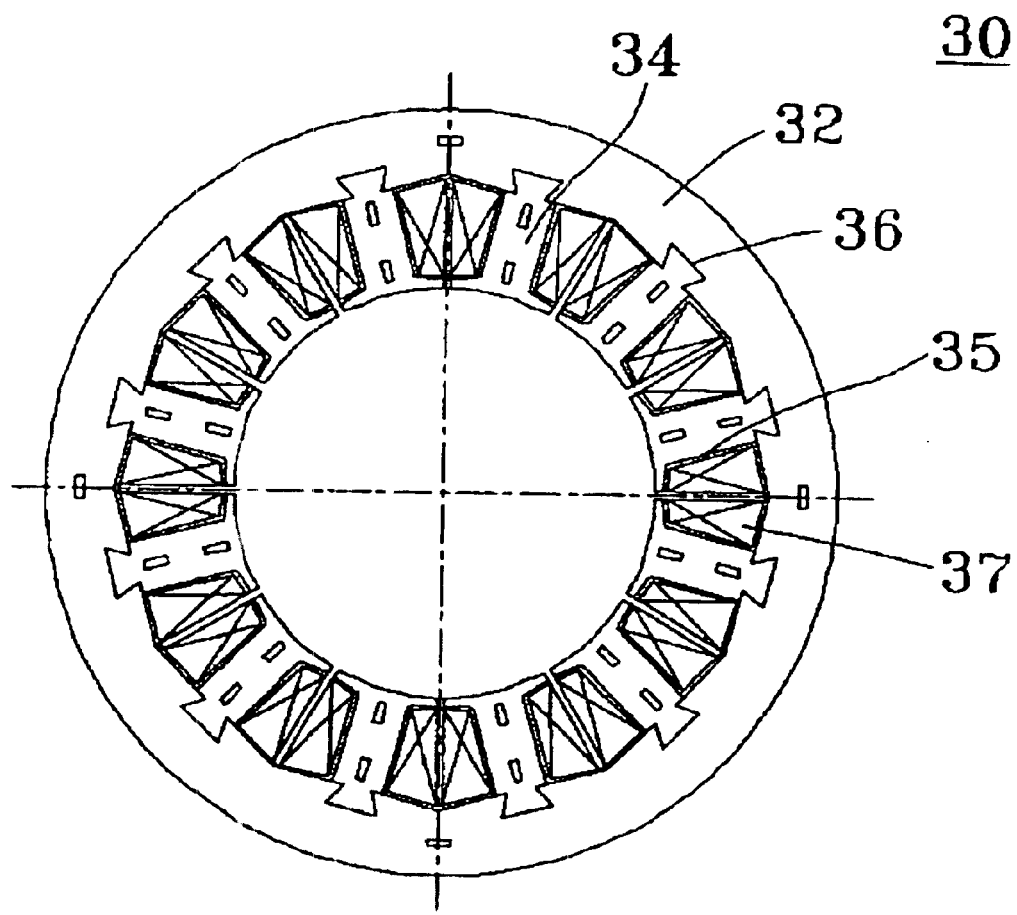
FIG. 3 is a schematic cross-sectional view of the stator structure of outer stator/inner rotor brushless motors of the prior art that is connected by use of dove-tailed scoop channel.
Figures 1, 3:
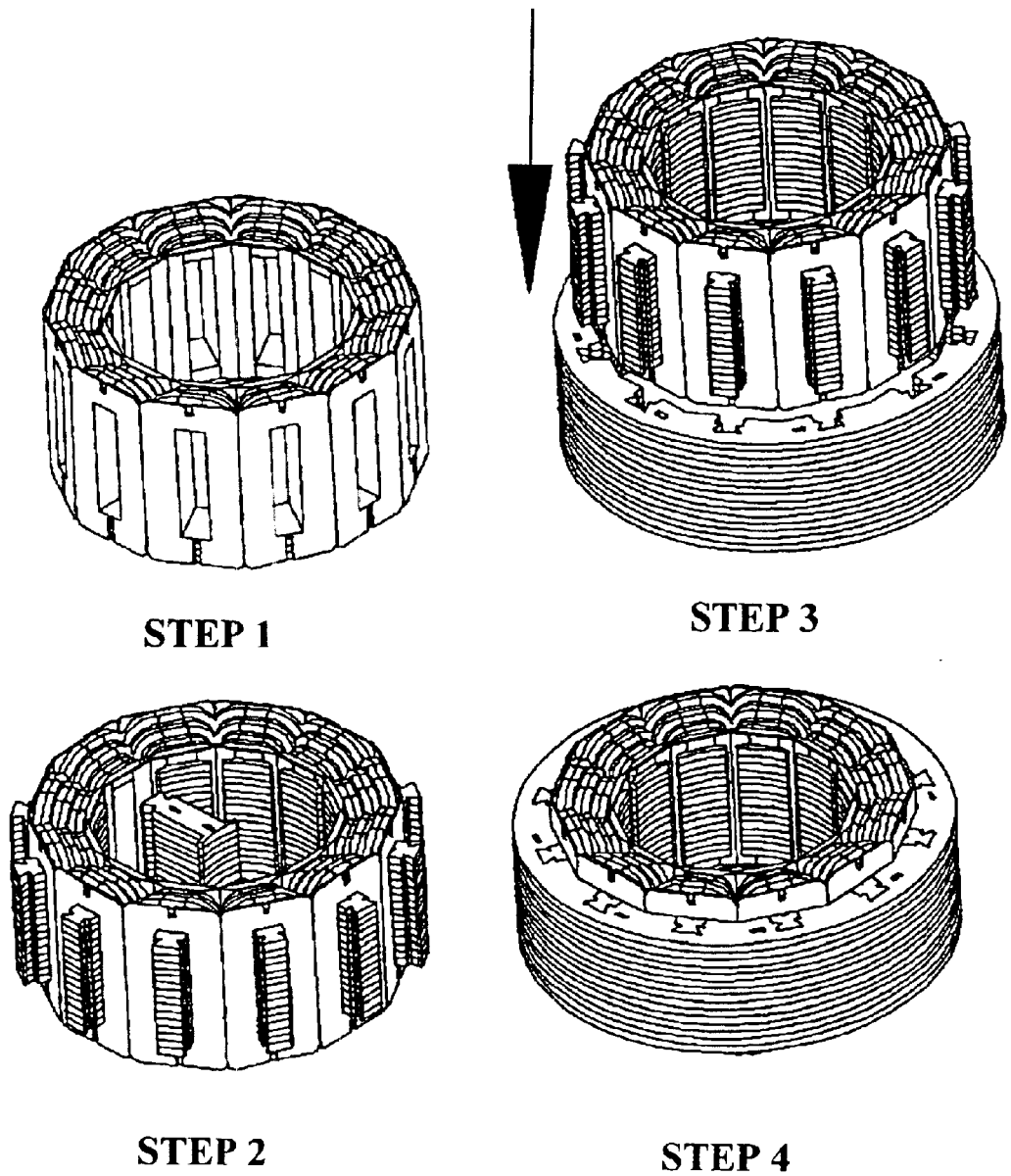
Figure 4:
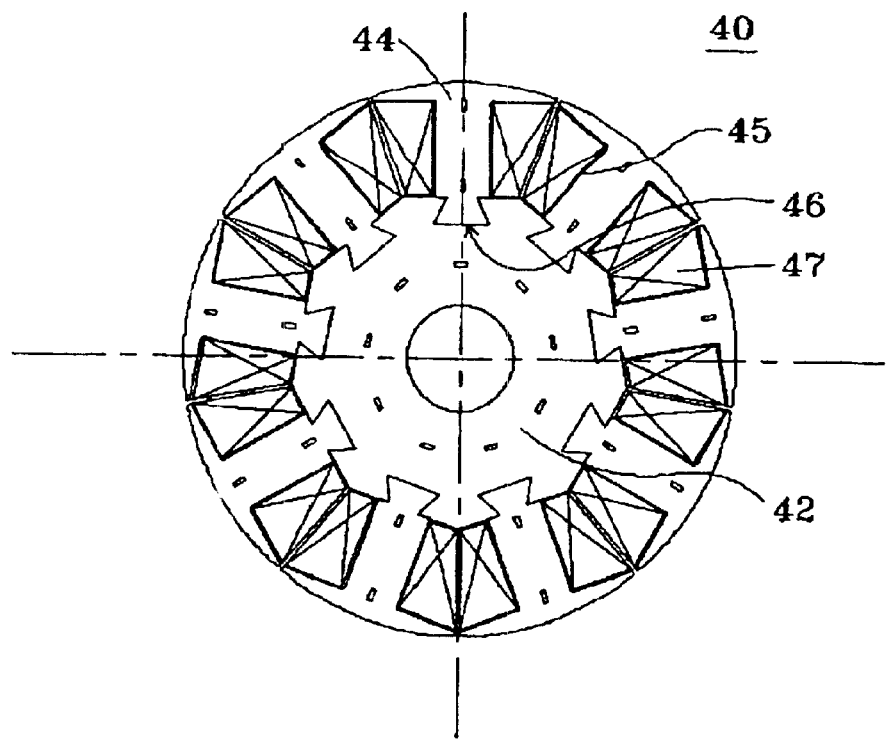
FIG. 4 is a schematic cross-sectional view of the stator structure of the inner stator/outer rotor brushless motors of the prior art that is connected by use of dove-tailed scoop channel.

Corresponding to FIG. 5-2 and 6A-2, respectively are FIG. 5-3 and FIG. 6A-3 that show the connecting method of the stator structure by use of double groove-and-tongue. As shown in FIG. 5-3 and FIG. 6A-3, each of the two internal sides of each scoop channel 53 on the main body of the outer stator 52 (refer to FIG. 6A-3) has a semi-circular protuberance 62; correspondingly, each of the two sides of the dedendum 63 of each disassembled radial toothlets 54 (refer to FIG. 5-3) has a semi-circular recess 66. The position of the protuberance 62 and the recess 66 are such that when the dedendum 63 of each toothlet 54 is inserted and tightly fitted into each scoop channel 53, the two semi-circular recesses 66 on the toothlet 54 and the two semi-circular protuberances 62 inside the scoop channel 53 are engaged each other. The assembling procedure for the assembly of the motor stator is the same as that shown in FIG. 7-2, thereby, shall not be repeated here.

Figure 1:
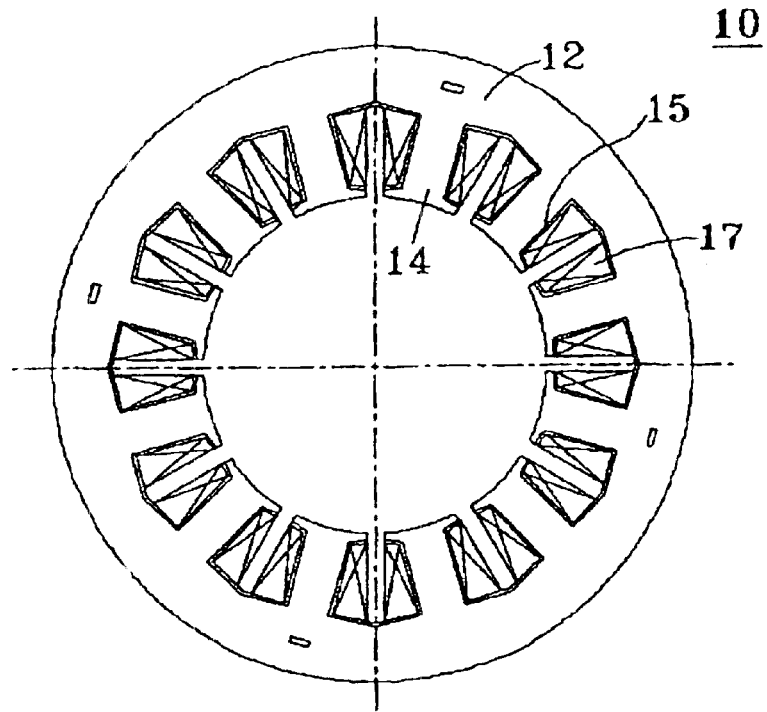
FIG. 1 is a schematic cross-sectional view of the stator structure of outer stator/inner rotor brushless motors of the prior art.

In comparison with the connecting method by use of dove-tailed scoop channel for assembly of the prior art shown in FIG. 3-1, the connecting methods of the invention, as described in the previous sections, by use of single groove-and-tongue or double groove-and-tongue eliminate the fracture problem due the stress concentration because there are no corners with acute angle in the semi-circular recesses 66 on the toothlet 54 and the semi-circular protuberance 62 inside the scoop channel 53 when they are engaged each other.

The outer stator 50 for various outer stator/inner rotor motors is assembled with a plurality of disassembled radial toothlets 54 and an main body of the outer stator 52 by use of the following four connecting methods: single positioning pin, double positioning pin, single groove-and-tongue, and double groove-and-tongue. Nevertheless, the contact surface 541 of the bottom of the rectangular toothlet root of the outer stator's disassembled radial toothlets to the stator main body can be linear shape, V shape, circular arc shape or any other shape that does not prevent each toothlet from being pushed and tightly fitted into the main body of the stator in radial direction. In other words, the shape of the contact surface 541 can be changed according the requirement of the design. For example, a V-shape or circular-arc-shape recess or protuberance (or stick out) can be added to the rectangular dedendum of the outer stator's disassembled radial toothlet to increase the stability of fixation to the main body of the stator. The connecting method of its assembly is the same as the four connecting methods described in the previous sections, which are: single positioning pin, double positioning pins, single groove-and-tongue, and double groove-and-tongue.

Figure 5A:
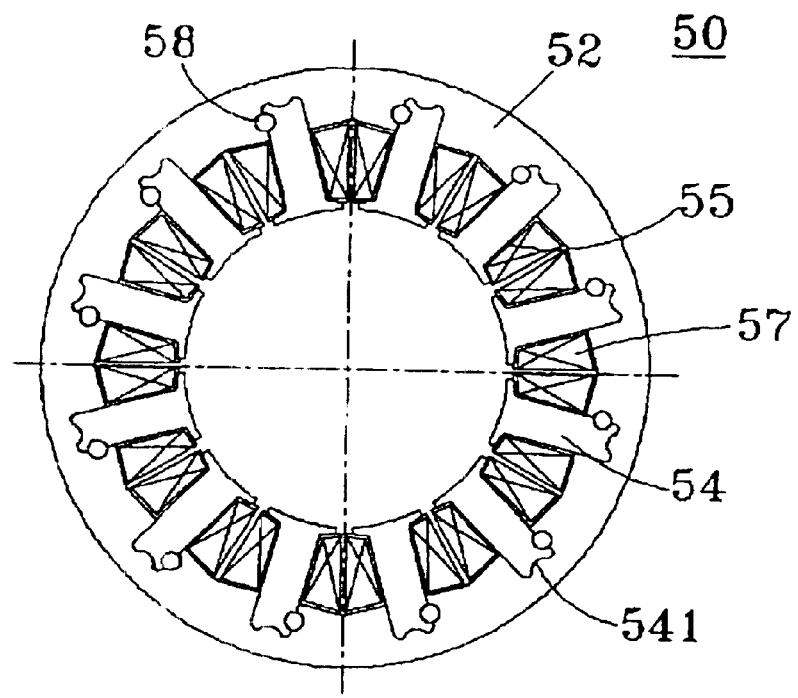
FIG. 5A is a schematic cross-sectional view of outer stator/inner rotor brushless motors of the invention that is assembled by use of single positioning pin connecting method wherein the configuration of the rectangular dedendum of the disassembled radial toothlet is changed from linear shape to a circular arc recess.
Figure 8A:
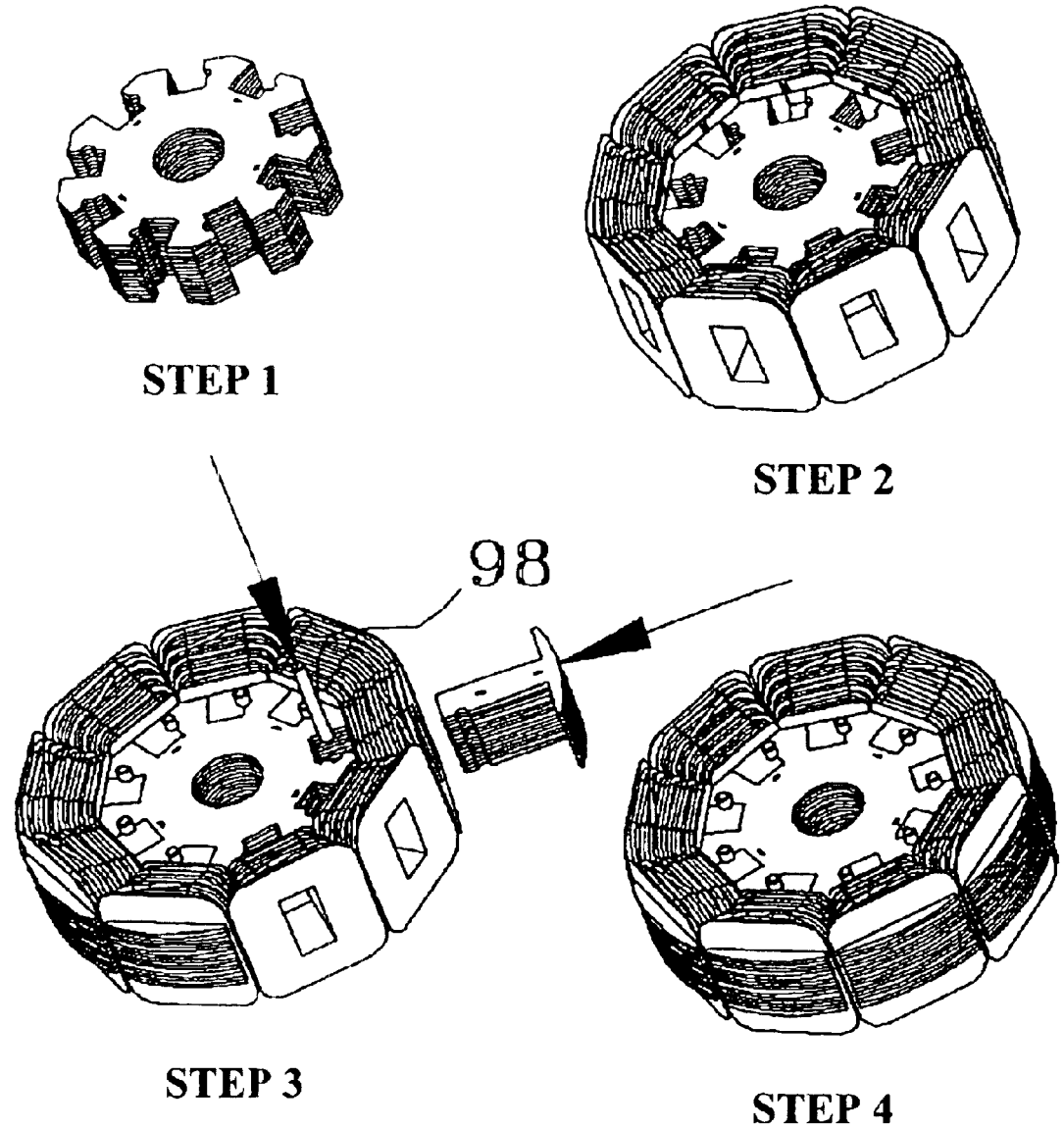
FIG. 8AA is a schematic cross-sectional view of the inner stator/outer rotor brushless motors of the invention assembled by use of single positioning pin connecting method wherein the shape of the inner stator/outer rotor brushless motor of the rectangular dedendum of the disassembled radial toothlet is changed from linear shape to a circular-arc-shape recess.
Figure 8B:
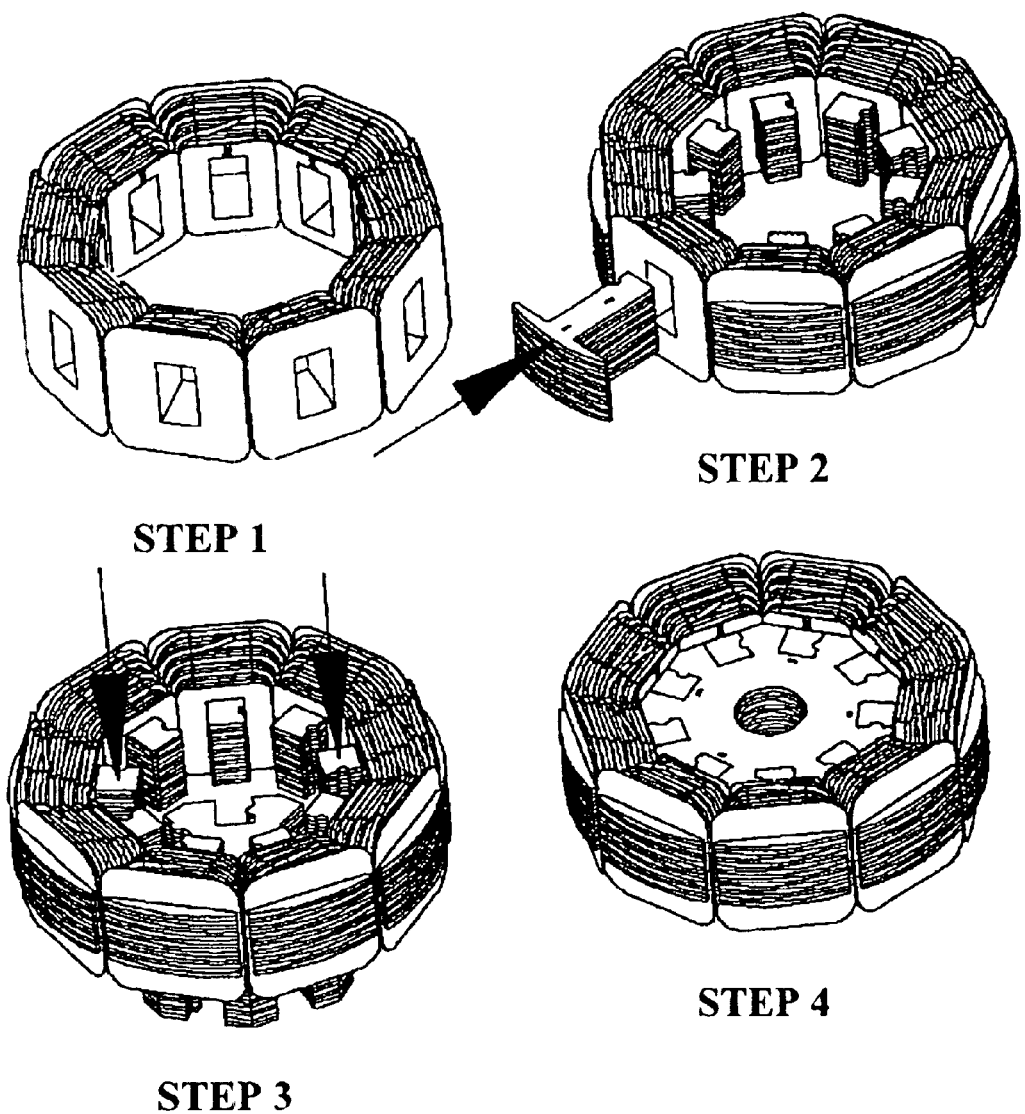
FIG. 8BB is a schematic cross-sectional view of the inner stator/outer rotor brushless motors of the invention assembled by use of single positioning pin connecting method wherein the shape of the rectangular dedendum of the disassembled radial toothlet is changed from linear shape to a V-shape recess.
Figures 2A, 8:
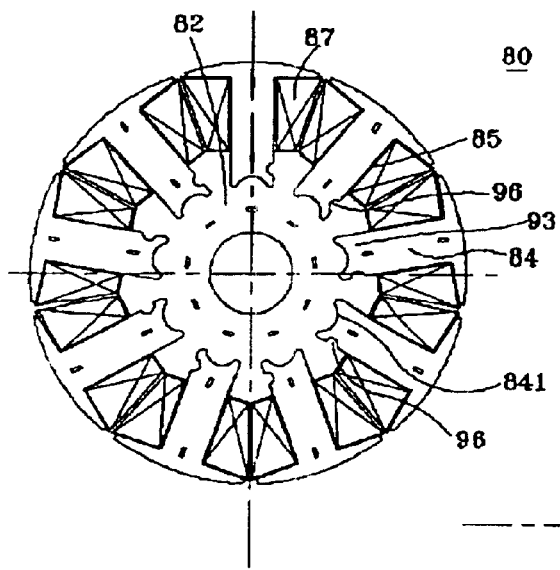
Figure 9A:
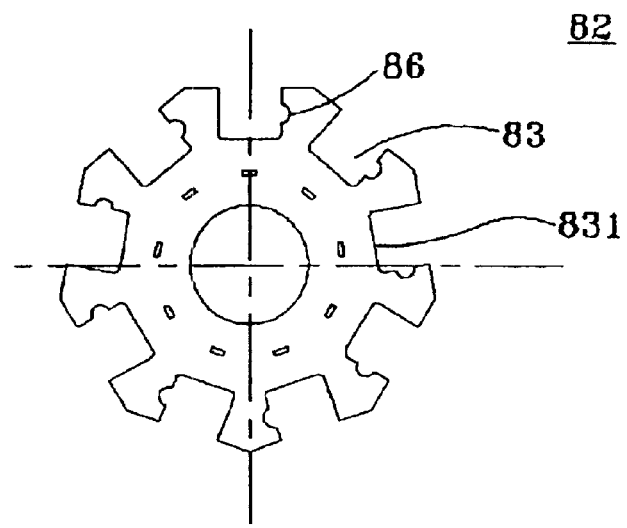
FIG. 9A is a schematic cross-sectional view of the main body 82 of the inner stator/outer rotor brushless motors of the invention assembled by use of single positioning pin connecting method.
Figure 9A:
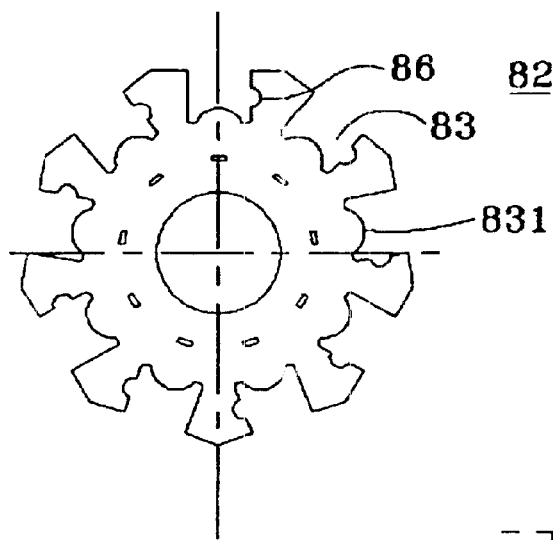
Figure 9A:
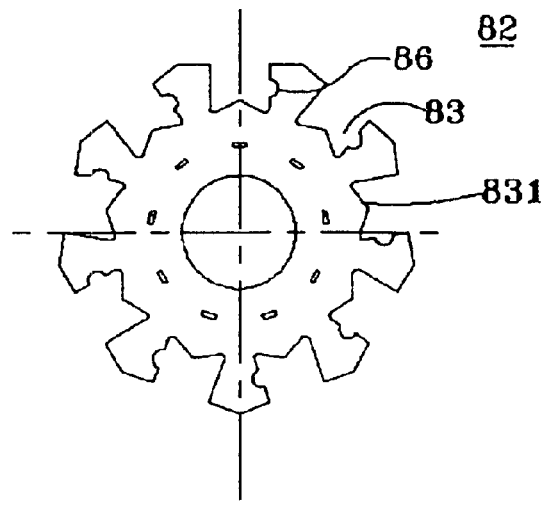
Figure 9B:
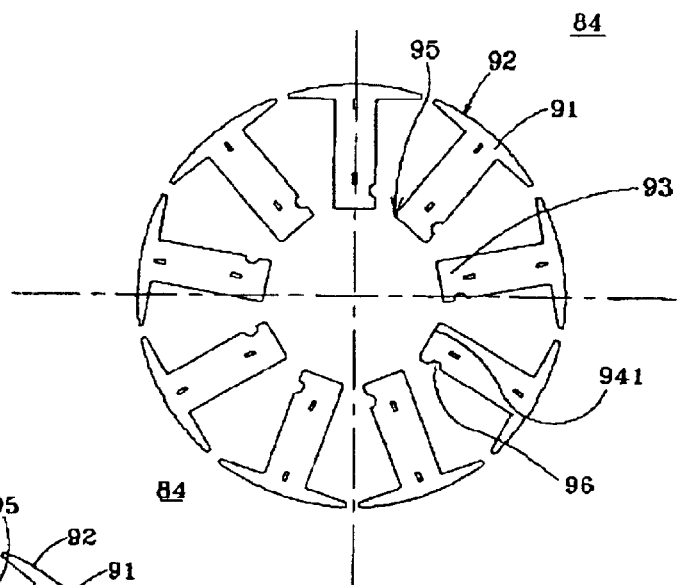
FIG. 9B is a schematic cross-sectional view of the main body 84 of the inner stator/outer rotor brushless motors of the invention assembled by use of single positioning pin connecting method.
Figure 9B:
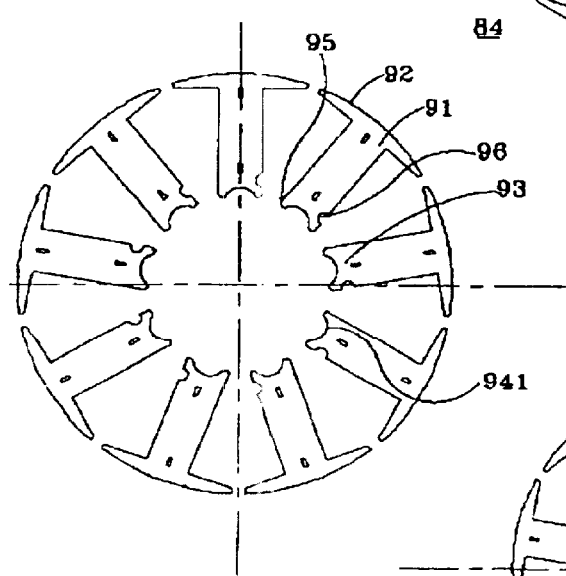
Figure 9B:
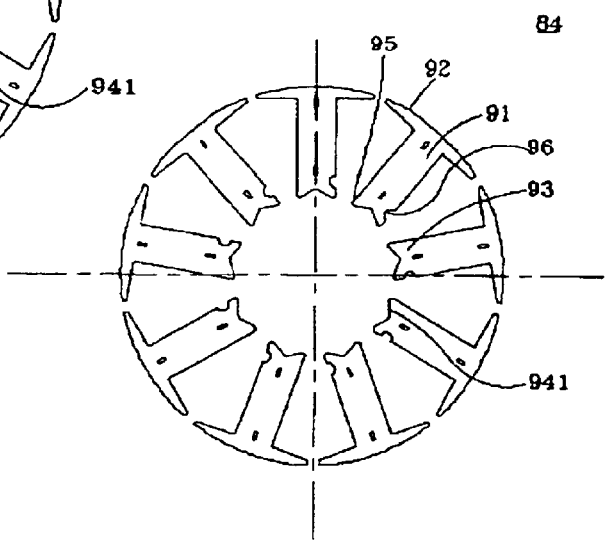
Figures 1, 9A:
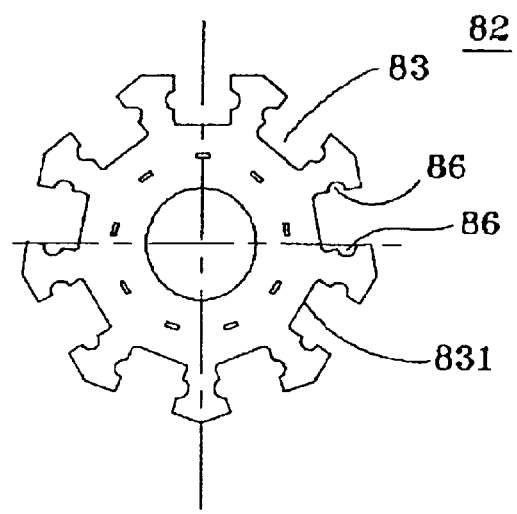
Figures 1A, 9A:
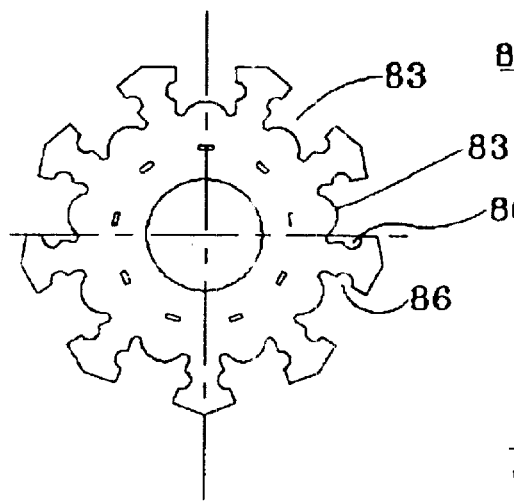

FIG. 5A is a modified diagram of FIG. 5 for single positioning pin connecting method showing that the change of shape, from linear shape to a circular-arc-shape recess, has been made to the bottom 541 of the rectangular dedendum of the radial toothlet. FIG. 6AA is a modified diagram of FIG. 6A for single positioning pin connecting method showing that the change of shape, from linear shape to a circular-arc-shape recess, has been made to the contact surface 531 of the main body of the stator to the bottom of the radial toothlet's rectangular dedendum. FIG. 6BA is a modified diagram of 6B for single positioning pin connecting method showing that the change of shape, from linear shape to a circular-arc-shape recess, has been made to the contact surface 631 of the bottom of the radial toothlet's rectangular dedendum to the main body of the stator. FIG. 5-1A, FIG. 5-2A, and FIG. 5-3A are the assembling diagrams of the assembling type outer stator/inner rotor motor when a circular-arc-shape recess is added to the bottom 541 of the rectangular dedendum of the outer stator's radial toothlet. Basically, all of the assembly methods are completely the same as the assembly of the outer stator/inner rotor motor of the invention if the circular-arc-shape recess is not added to the rectangular dedendum of the outer stator's radial toothlet. FIG. 6A-1A, FIG. 6A-2A, and FIG. 6A-3A are the diagrams that shows the contact surface 531 of the main body of the stator to the bottom of the radial toothlet's rectangular dedendum changing from linear shape to a circular-arc-shape recess. FIG. 6B-1A and FIG. 6B-2A are the diagrams that shows the contact surface 631 of the bottom of the radial toothlet's rectangular dedendum to the main body of the stator changing from linear shape to a circular-arc-shape recess.

Figure 5B:
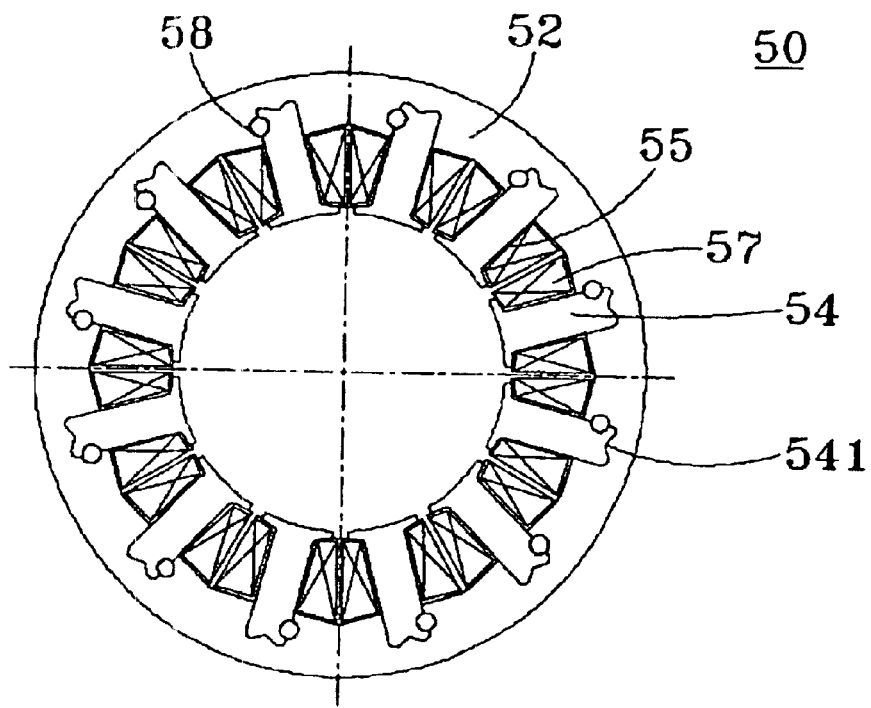
FIG. 5B is a schematic cross-sectional view of outer stator/inner rotor brushless motors of the invention that is assembled by use of single positioning pin connecting method wherein the shape of the rectangular dedendum of the disassembled radial toothlet is changed from linear shape to a V-shape notch.
Figures 2B, 8:
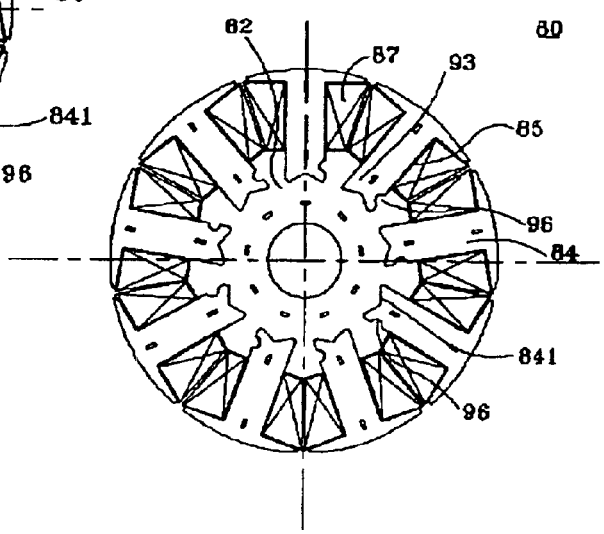
Figures 3, 8:
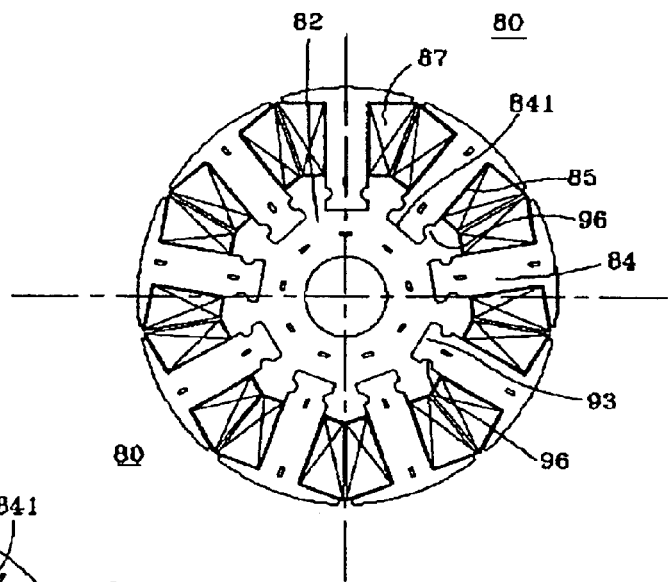
Figures 3A, 8:
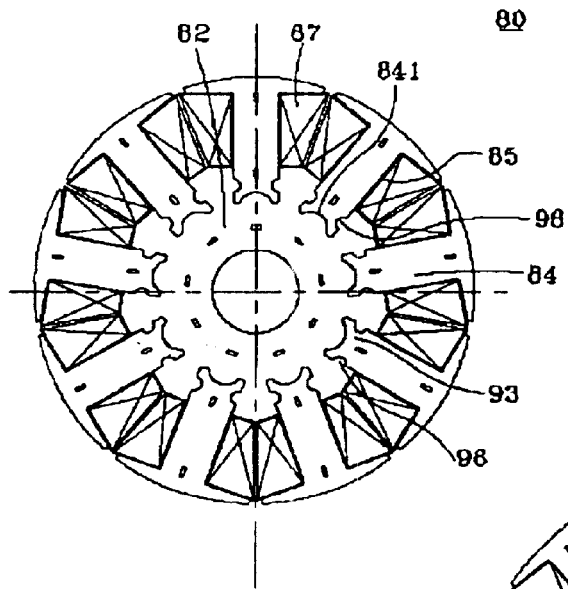
Figures 3B, 8:
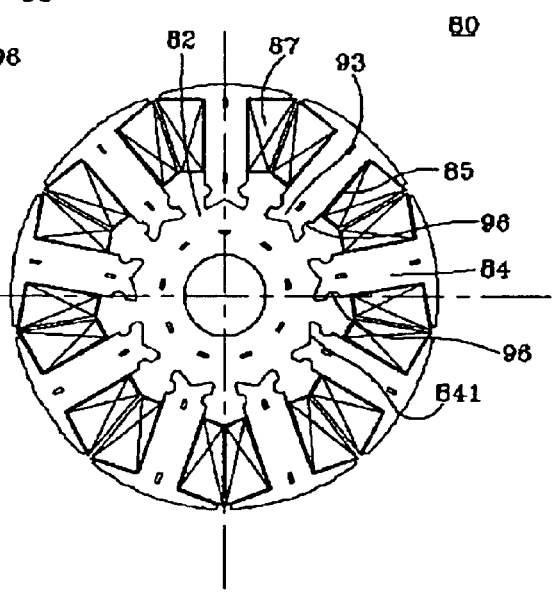
Figures 1B, 9A:
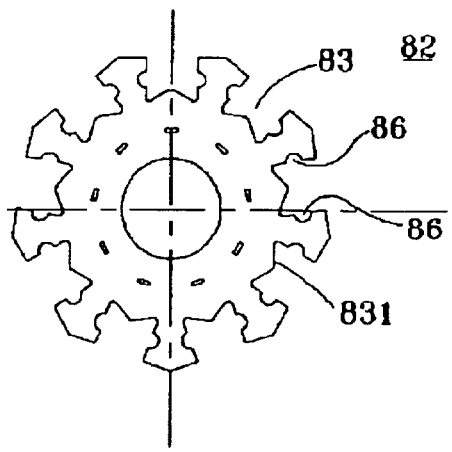
Figures 1, 1A, 1B, 9B:
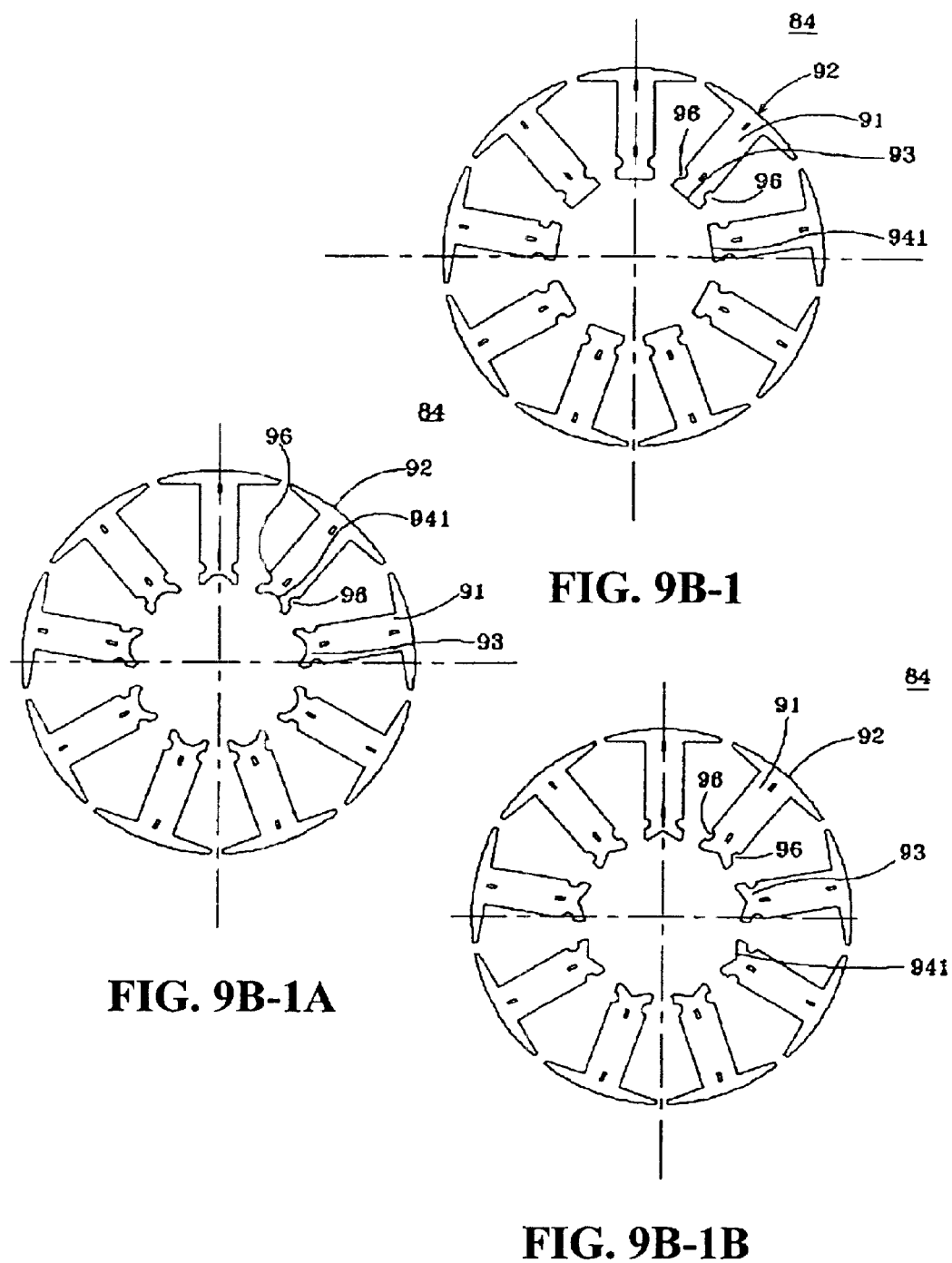

FIG. 5B is a modified diagram of FIG. 5 that shows the change of the bottom 541 of the radial toothlet's rectangular dedendum from linear shape to a V-shape recess for single positioning pin connecting method. FIG. 6AB is a modified diagram of FIG. 6A that shows the change of the contact surface 531 of the main body of the stator to the bottom of the radial toothlet's rectangular dedendum from linear shape to a V-shape recess for single positioning pin connecting method. FIG. 6BB is a modified diagram of FIG. 6B that shows the changes of the contact surface 631 of the bottom of the radial toothlet's rectangular dedendum to the main body of the stator from linear shape to a V-shape recess for single positioning pin connecting method. FIG. 5-1B, FIG. 5-2B, and FIG. 5-3B are the assembling diagrams of the assembling type outer stator/inner rotor motor when a V-shape recess is added to the bottom 541 of the rectangular dedendum of the outer stator's radial toothlet. All of the assembly methods are completely the same as the assembly of the outer stator/inner rotor motor of the invention if the V-shape recess is not added to the rectangular dedendum of the outer stator's radial toothlet. FIG. 6A-1B, FIG. 6A-2B, and FIG. 6A-3B are the diagrams that shows the change of the contact surface 531 of the main body of the stator to the bottom of the radial toothlet's rectangular dedendum from linear shape to a V-shape recess. FIG. 6B-1B and FIG. 6B-2B are diagrams that show the change of the contact surface 631 of the bottom of the radial toothlet's rectangular dedendum to the main body of the stator from linear shape to a V-shape recess.

As for the contact surfaces of the rectangular dedendum of the outer stator's toothlet and the main body of the stator, no matter whether it is a V-shape or circular arc shape protuberance, or any other shaped protuberance that does not prevent each radial toothlet from being pushed and tightly fitted into the main body of the stator in radial direction, the principle is similar to the previous description of adding V-shape or circular-arc-shape recess, and shall not be repeated here.

Figure 10:
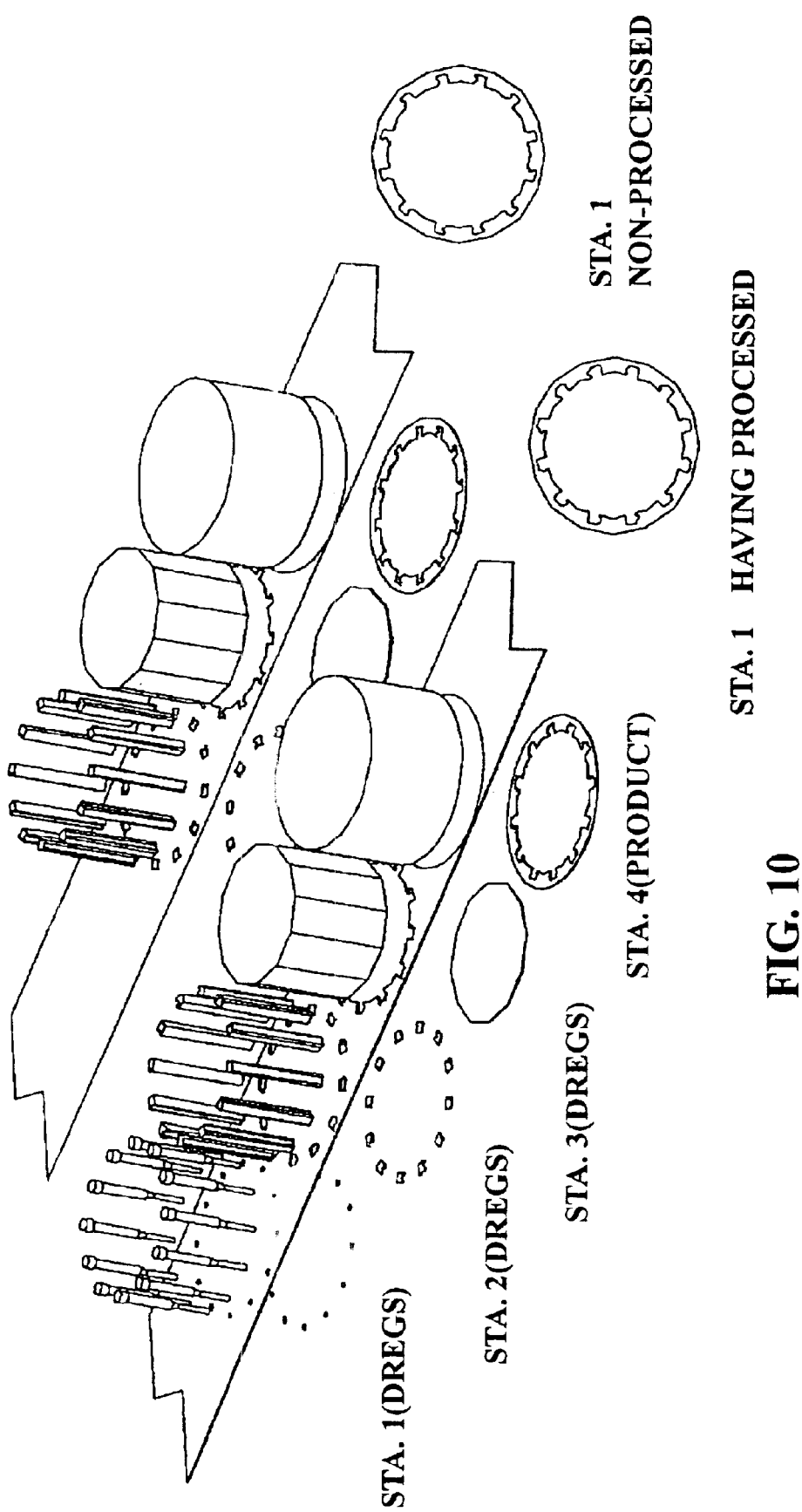
FIG. 10 is a schematic punching diagram of the main body 52 of the outer stator of the invention shown in FIG. 6A and FIG. 6A-2.
Figure 11:
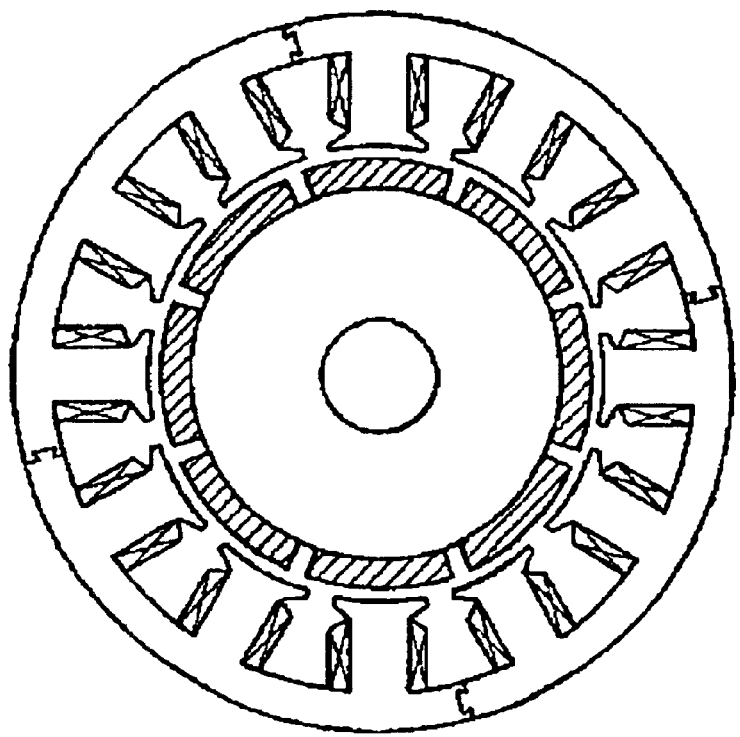
FIG. 11 is a schematic cross-sectional view of the structure of the assembling type outer stator motor of the prior art of U.S. Pat. No. 6,265,804.
Figure 12:
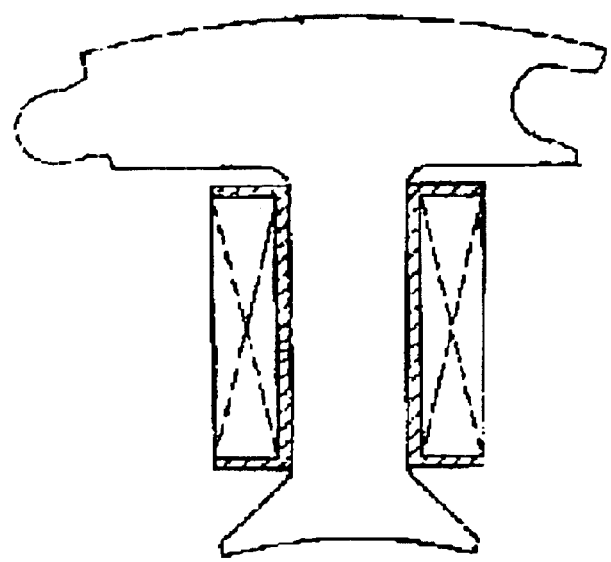
FIG. 12 is a schematic cross-sectional view of the structure of the assembling type outer stator motor of the prior art of U.S. Pat. No. 5,786,651.
Figure 13:
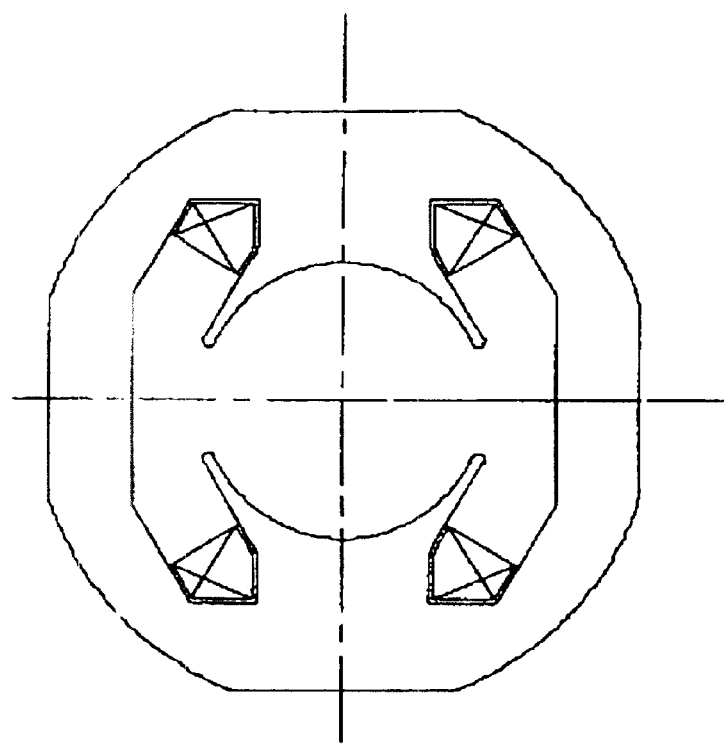
FIG. 13 is a schematic cross-sectional view of the outer stator for outer stator brush shunt motor of the prior art.
Figure 14:
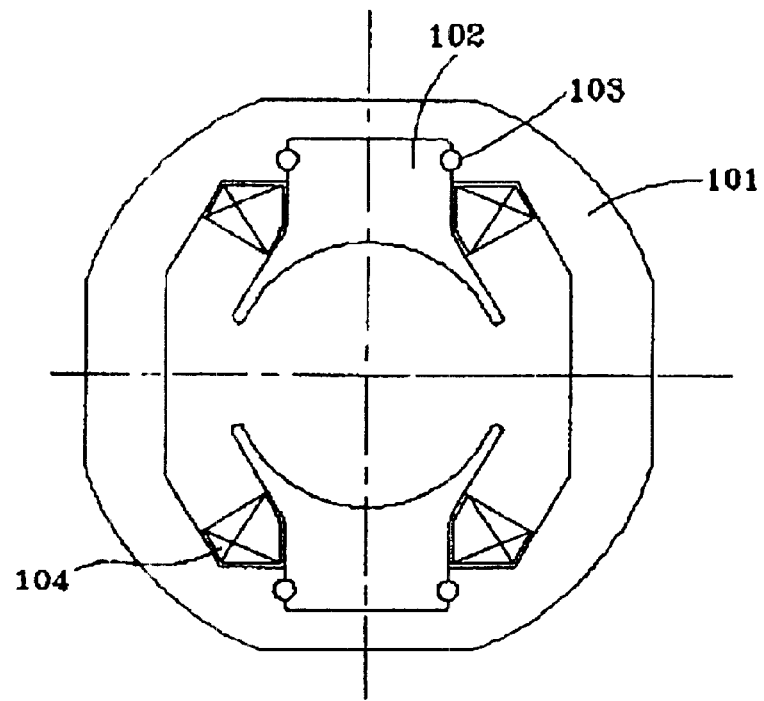
FIG. 14 is a schematic cross-sectional view of the assembling type dipole outer stator shunt brush motor of the invention, in which the main body of the stator is not disassembled, and the dedendum of the radial toothlet is connected to the main body of the stator by use of double positioning pins.
Figures 1, 14:
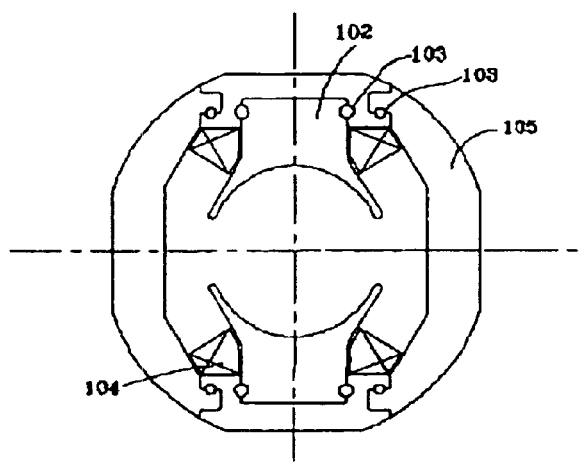
Figures 2, 14:
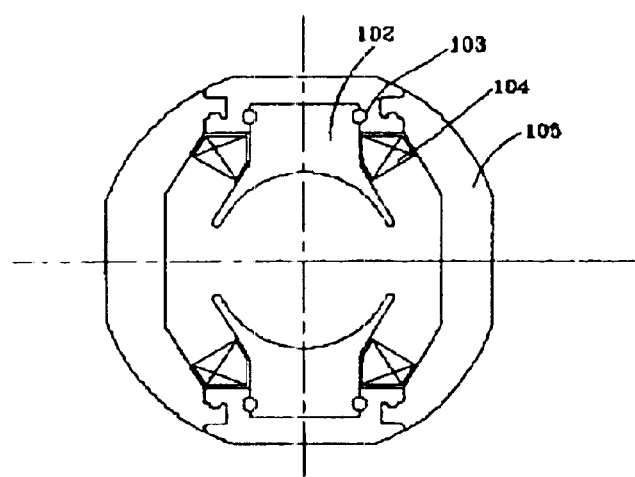
Figures 3, 14:
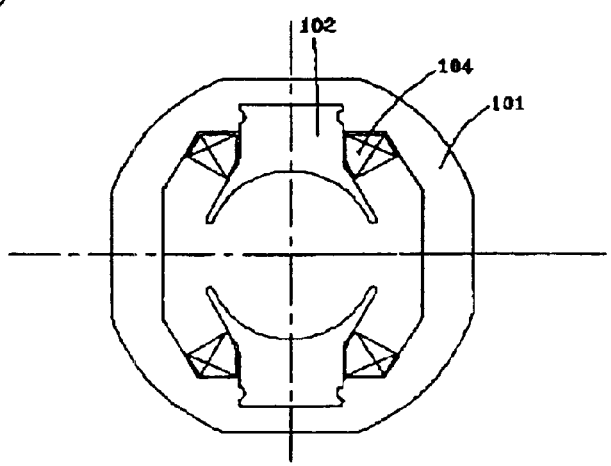
Figures 4, 14:
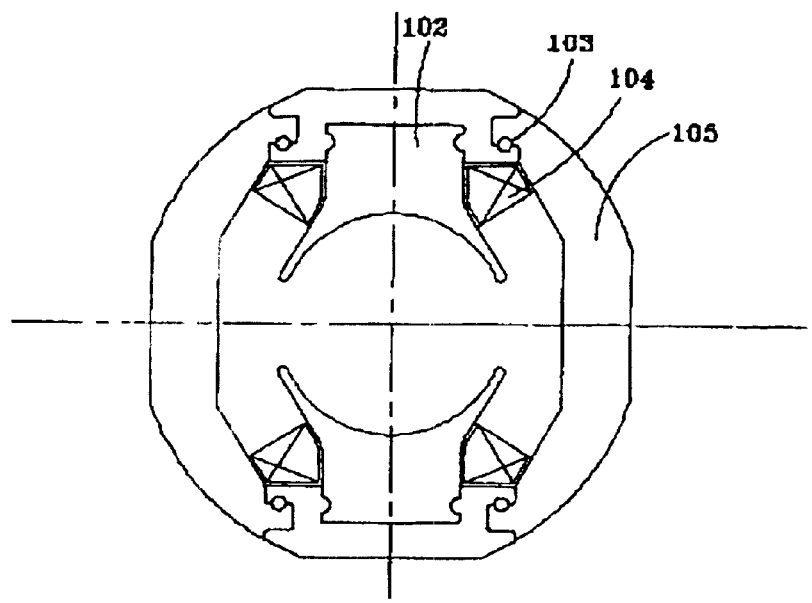
Figures 5, 14:
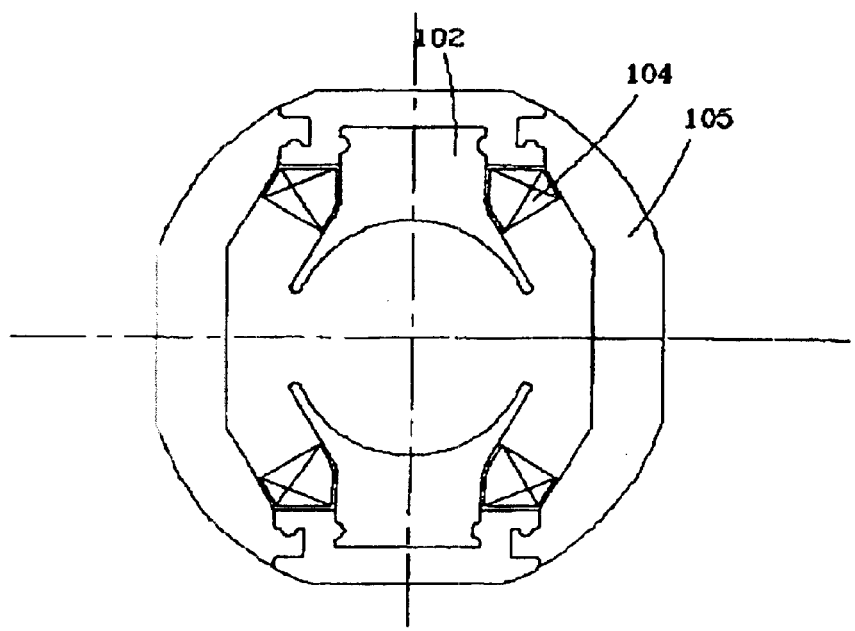
Figure 15:
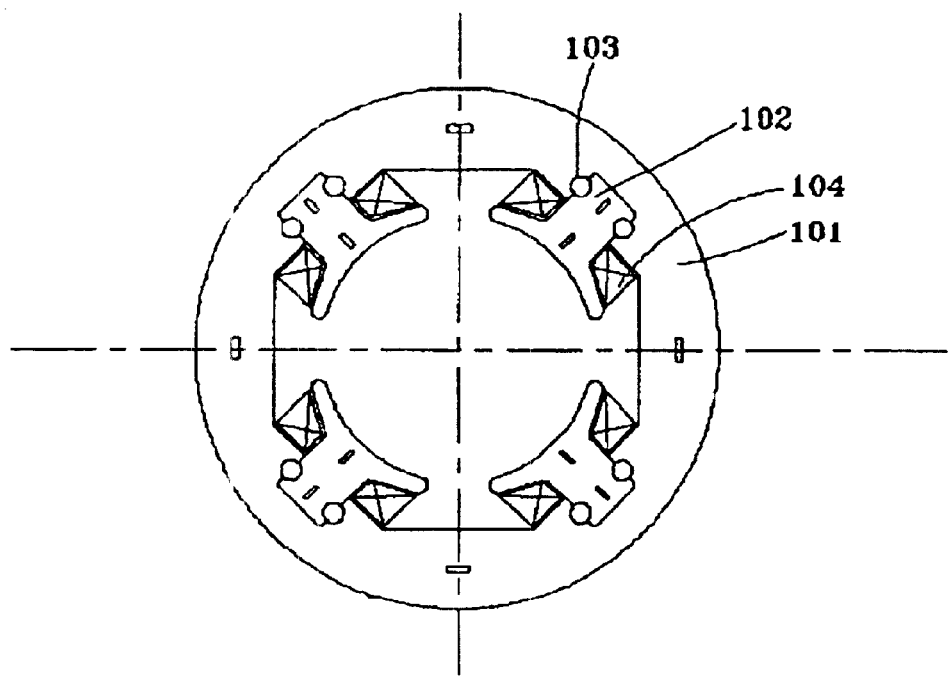
FIG. 15 is a schematic cross-sectional view of the assembling type quadri-pole outer stator shunt brush motor of the invention, in which the main body of the stator is not disassembled, and the dedendum of the radial toothlet is connected to the main body of the stator by use of double positioning pins.
Figures 1, 15:
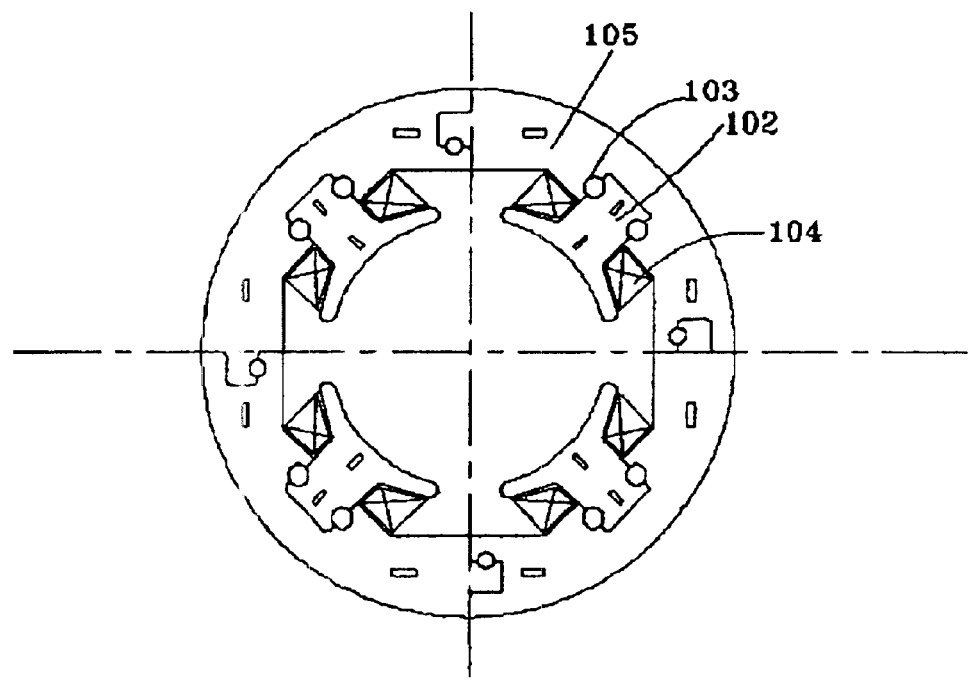
Figures 2, 15:
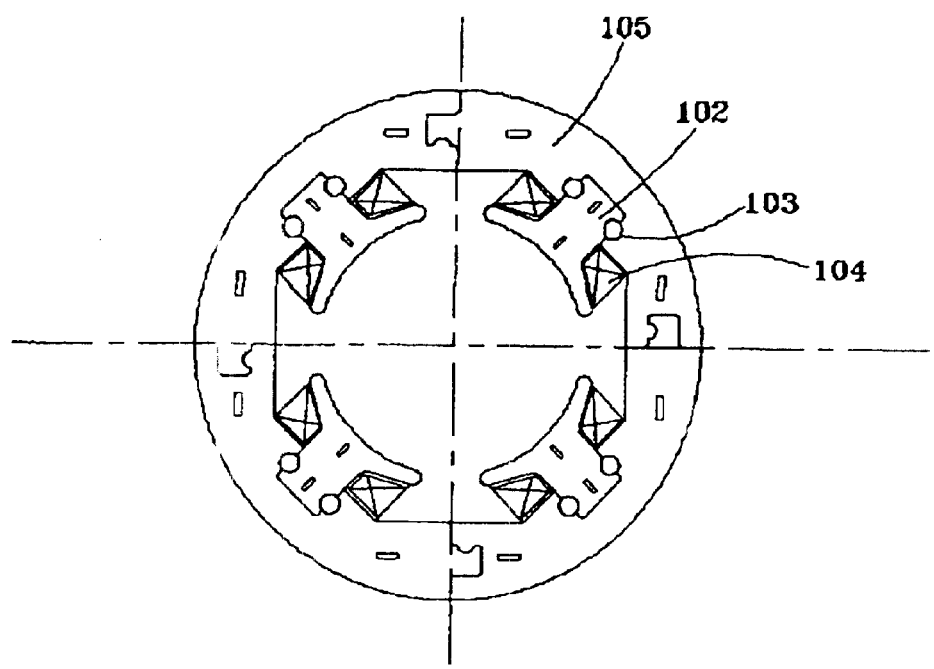
Figures 3, 15:
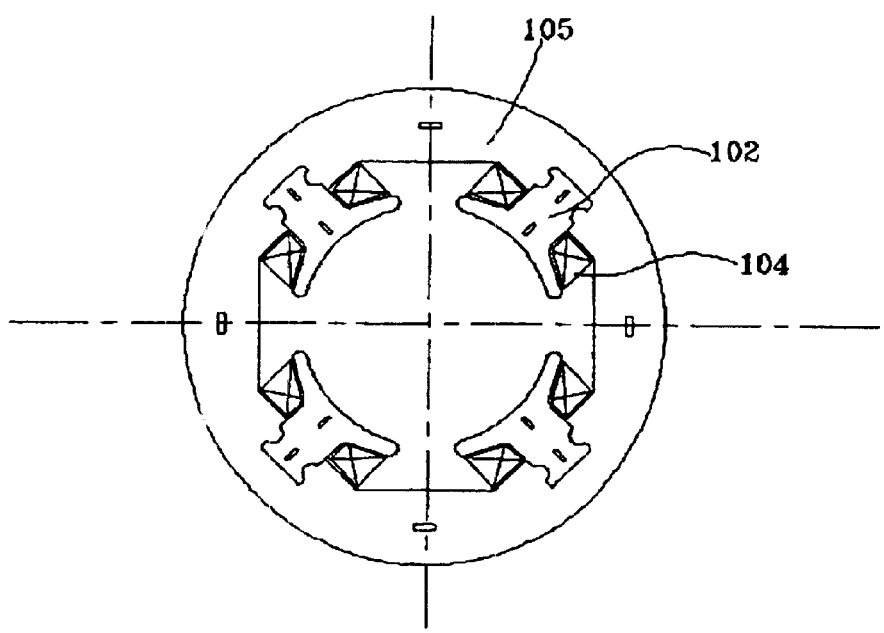
Figures 4, 15:
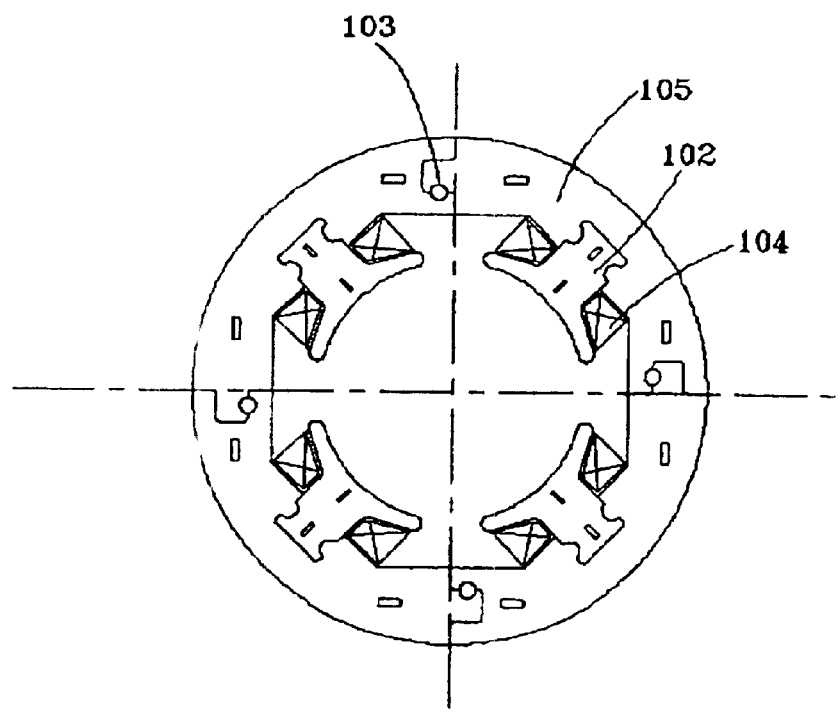
Figures 5, 15:
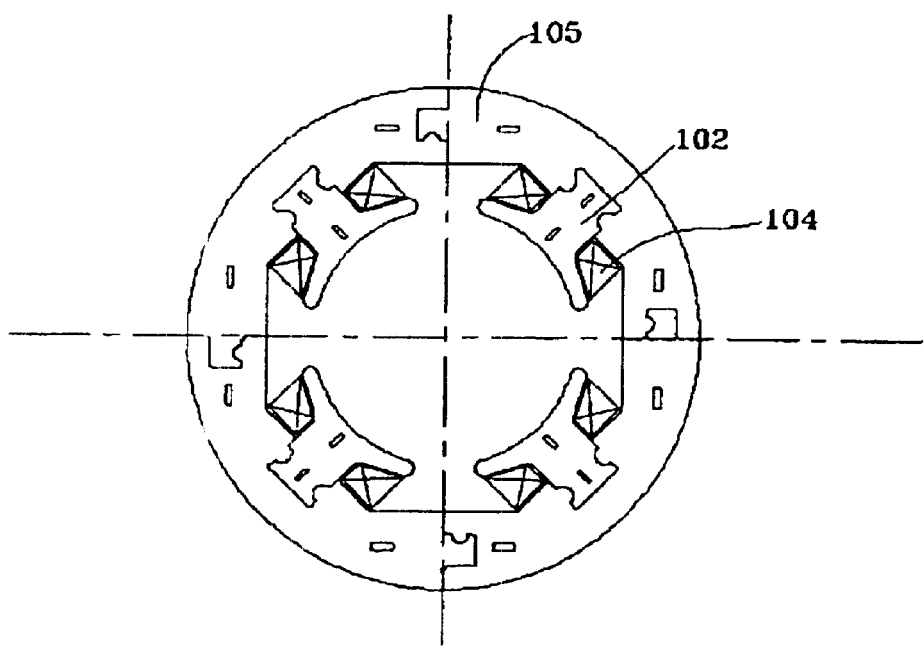

FIG. 10 is the diagram that depicts the punching operation of the main body of the outer stator 52 of the invention shown in FIG. 6A and the main body of the outer stator 52 shown in FIG. 6A-2. There is only one difference in hole-punching operation between the main body of the outer stator 52 (used for the assembling by use of single positioning pin connecting method) in FIG. 6A and the main body of the outer stator 52 (used for the assembling by use of single groove-and-tongue connecting method) in FIG. 6A-2. Therefore, the design in sequential punching mold can be planned together. Moreover, since one needs only to determine the enabling or disabling of this punching operation during the punching process to obtain two components with different design, the developing cost of the mold can be greatly lowed.

Inner Stator/Outer Rotor Brushless Motor

Figures 2, 8:
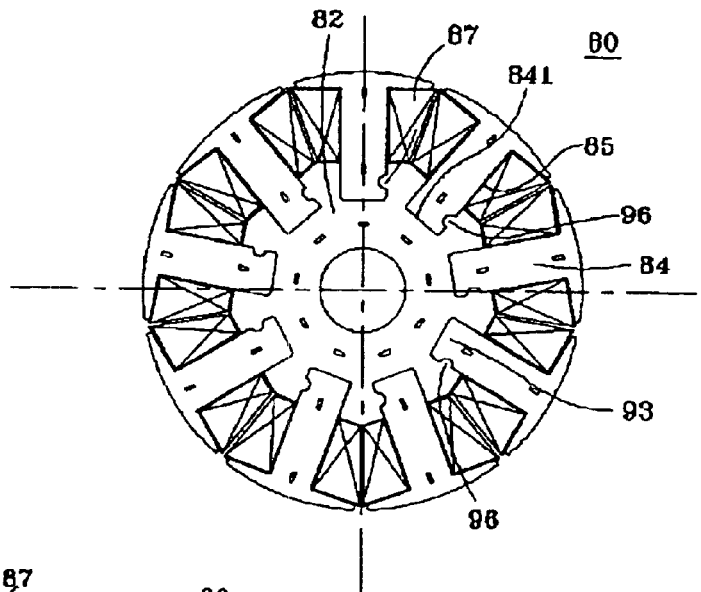
FIG. 8 is a schematic cross-sectional view of the inner stator/outer rotor brushless motors of the invention assembled by use of single positioning pin connecting method.

FIG. 8 is a schematic cross-sectional view of the invention applied in the inner stator/outer rotor brushless motor. As shown in FIG. 8, the inner stator/outer rotor brushless motor of the invention includes an inner stator 80 and an outer rotor (not shown in FIG. 8). The inner stator 80 includes an inner main body 82 of the stator, a plurality of toothlets 84, a plurality of positioning pins 98 (refer to FIG. 8A), a plurality of bobbins 85, and a plurality of coils 87. FIG. 9A is a schematic cross-sectional view of the inner main body of the stator 82 of the inner stator/outer rotor motors of the invention. FIG. 9B is a cross-sectional configuration diagram of a plurality of disassembled radial toothlets of the inner stator/outer rotor motors of the invention. As shown in FIG. 9A and FIG. 9B, a plurality of scoop channels 83 are evenly disposed on the internal side of the inner main body of the stator 82 according to the number of the teeth of the stator for housing a plurality of toothlets 84 with the same number. A plurality of toothlets 84 thereof is disassembled according to the actual required number of toothlets. As shown in FIG. 9B, each of a plurality of toothlets 84 includes a addendum 91 and a rectangular dedendum 93. The toothlet 84 is constructed by punching and stacking up a plurality of permeable silicon steel sheets (refer to FIG. 8A). The top end 92 of the addendum 91 is a circular arc surface and a applicable air gap (not shown) is kept from its corresponding outer rotor (not shown). The dedendum 93 of each toothlet 84 matches the configuration and size of the scoop channel 83 so that the toothlet can be inserted and tightly fitted into the scoop channel 83. Each of two corners of the rectangular dedendum 93 has a chamfer 95 to facilitate the insertion of the toothlet into the main body of the stator 82.

The assembling type inner stator/outer rotor motor is assembled by inserting the dedendum 93 of each disassembled radial toothlet 84 into each scoop channel 83 by use of single positioning pin connecting method. As shown in FIG. 9A, one internal side of each scoop channel 83 has a semi-circular recess 86; correspondingly, one side of the dedendum 93 of each disassembled radial toothlet 84 also has a semi-circular recess 96. The position of the semi-circular recess 96 is such that it corresponds to the semi-circular recess 86 in one internal side of the scoop channel 83 when the dedendum 93 of each toothlet 84 is inserted and tightly fitted into the scoop channel 83. As a result, an assembly hole 88 (refer to FIG. 8) is formed between one side of the scoop channel 83 and the corresponding side of the dedendum 93 of the toothlet 84. On the other hand, a plurality of bobbins 85 made of insulated material is used to be slipped on a plurality of toothlets 84 for winding.

The assembly procedure of the invention applied in inner stator/outer rotor motors is similar to that of the outer stator/inner rotor motors shown in FIG. 7. FIG. 8A is a isometric assembling diagram of the invention applied in the inner stator/outer rotor brushless motors. As shown in FIG. 8a, the assembling procedure for the stator of the motor is described in the following four steps. Step 1: appropriately place the constructed main body of the stator 82 for the inner stator/outer rotor motors. Step 2: place a plurality of coils 87 that has completed winding on the bobbin 85 at an appropriate position inside the inner main body of the stator 82. Step 3: insert one single toothlet 84 after another into the scoop channel 83 of the inner main body of the stator 82 into the center of the axis, then knock the positioning pin 98 (refer to FIG. 8A) into the matching assembly hole 88 one by one. Step 4: complete the assembly of the stator of inner stator/inner rotor motor as the last step. Since the assembling is in radial direction, a chamfer 95 is made at each corner of each dedendum 93, the assembly is relatively easier and faster comparing with the assembly process of the prior art shown in FIG. 3-1 which requires the assembly be done in axial direction by use of dove-tailed scoop channel.

The assembling work of the assembling type inner stator/outer rotor motor is accomplished by the following four connecting methods: single positioning pin, double positioning pin, single groove-and-tongue, and double groove-and-tongue.

The connecting method for the stator structure by use of single positioning pin has been described previously. As for the connecting method for the stator structure by use of double positioning pins, one can refer to FIG. 8-1, FIG. 9A-1, and FIG. 9B-1 that are corresponding to FIG. 8, FIG. 9A, and FIG. 9B, respectively. As shown in FIG. 8-1, FIG. 9A-1, and FIG. 9B-1, each of the two internal sides of each scoop channel 83 on the inner main body of the stator 82 has a semi-circular recess 86 (refer to FIG. 9A-1), and correspondingly, each of the two sides of the dedendum 93 of the disassembled radial toothlet 84 also has a semi-circular recess 96 (refer to FIG. 9B-1). The position of the two semi-circular recesses 96 are such that they will correspond to the two semi-circular recesses 86 on the two internal sides of the scoop channel 83 when the dedendum 93 of each toothlet 84 is inserted and tightly fitted into the scoop channel 83. As a result, two assembly holes 88 (refer to FIG. 8-1) are formed between each of two sides of the scoop channel 83 and their corresponding sides of the dedendum 93 of the toothlet 84. The assembly procedure is the same as that shown in FIG. 8A except that it requires two positioning pins for each toothlet 84.

Refer to FIG. 8-2 and FIG. 9A-2 that are corresponding to FIG. 8 and FIG. 9A for the assembling by use of single groove-and-tongue connecting method. As shown in FIG. 8-2 and FIG. 9A-2, each internal side of each scoop channel 83 on the inner main body of the stator 82 (refer to FIG. 9A-2) has a semi-circular protuberance 92, correspondingly, each side of the dedendum 93 of each disassembled radial toothlet 84 (refer to FIG. 8-2) has a semi-circular recess 96. The positions of the semi-circular protuberance 92 and the semi-circular recess 96 are such that when the dedendum 93 of each toothlet 84 is inserted and tightly fitted into each scoop channel 83, the semi-circular recess 96 on the toothlet 84 and the semi-circular protuberance 92 inside the scoop channel 83 are engaged each other. The connecting method of the assembling work is similar to that shown in FIG. 7-2, which is a isometric diagram for the assembly of outer stator/inner rotor motor assembled by use of single groove-and-tongue connecting method. FIG. 8B is a isometric diagram of the invention applied in inner stator/outer rotor brushless motors by use of single groove-and-tongue connecting method wherein the assembling procedure of the motor stator is described in the following four steps. Step 1: appropriately place a plurality of coils 87 that has completed winding on the bobbin 85. Step 2: insert one single toothlet 84 after another into the bobbin 85 into the center of the axis. Step 3: fit the coil 87 with inserted toothlets 84 into the scoop channel 83 inside the inner main body of the stator 82 of the inner stator 80 in axial direction, so that the semi-circular recess 96 on the toothlet 84 and the semi-circular protuberance 92 inside the scoop channel 83 are engaged each other. Step 4: complete the assembly of the stator of the inner stator/outer rotor motor as the last step. This design is more applicable for the motors of lower stacking ratio of silicon steel sheets because when assembling the inner stator 80, each toothlet 84 must be inserted into the bobbin 85 that has completed winding and then be inserted into the inner main body of the stator 82 in axial direction together. Otherwise, wire connection can be complicated if the toothlet 84 is inserted into the inner main body of the stator 82 one by one.

Corresponding to FIGS. 8-2 and 9A-2 are FIG. 8-3 and FIG. 9A-3 respectively for the connecting method of the stator structure by use of double groove-and-tongue. As shown in FIG. 8-3 and FIG. 9A-3, each of the two internal sides of each scoop channel 83 on the inner main body of the stator 82 (refer to FIG. 9A-3) has a semi-circular protuberance 92, and correspondingly, each of the two sides of each dedendum 93 of the disassembled radial toothlets 84 (refer to FIG. 8-3) has a semi-circular recess 96. The position of the protuberance 92 and the recess 96 are such that when the dedendum 93 of each toothlet 84 is inserted and tightly fitted into each scoop channel 83, the two semi-circular recesses 96 on the toothlet 84 and the two semi-circular protuberance 92 inside the scoop channel 83 are engaged each other. The assembling procedure for the assembly of the motor stator is the same as that of the assembly by use of single groove-and-tongue connecting method shown in FIG. 8B, and shall not be repeated here.

As one compare with the connecting method by use of dove-tailed scoop channel for assembling work of the prior art shown in FIG. 3-1, the connecting methods of the invention as described previously by use of either single groove-and-tongue or double groove-and-tongue method can eliminate the fracture problem due the stress concentration because there is no corner of acute angle in the semi-circular recesses 96 on the toothlet 84 and the semi-circular protuberance 92 inside the scoop channel 83 when they are engaged each other. Similarly, the contact surface 841 of the rectangular toothlet root bottom of the inner stator's disassembled radial toothlets to the stator main body can be linear shape, V shape, circular arc shape, or any other shapes that do not prevent each toothlet from being pushed and tightly fitted into the main body of the stator in radial direction. In other words, the shape of the contact surface 841 can be changed according the requirement of the design. For example, a V-shape or circular-arc-shape recess or protuberance can be added to the rectangular dedendum of the inner stator's disassembled radial toothlet to increase the stability of fixation to the main body of the stator. The connecting method of its assembling work is the same as the four connecting methods described previously, they are: single positioning pin, double positioning pins, single groove-and-tongue, and double groove-and-tongue.

FIG. 8AA is a modified diagram of FIG. 8 for single positioning pin connecting method showing that the change of shape, from linear shape to a circular-arc-shape recess, has been made to the bottom 841 of the rectangular dedendum of the radial toothlet. FIG. 9AA is a modified diagram of FIG. 9A for single positioning pin connecting method showing that the change of shape, from linear shape to a circular-arc-shape recess, has been made to the contact surface 831 of the main body of the stator to the bottom of the radial toothlet's rectangular dedendum. FIG. 9BA is a modified diagram of 9B for single positioning pin connecting method showing that the change of shape from linear shape to a circular-arc-shape recess has been made to the contact surface 941 of the bottom of the radial toothlet's rectangular dedendum to the main body of the stator. FIG. 8-1A, FIG. 8-2A, and FIG. 8-3A are the assembling diagrams of the assembling type inner stator/outer rotor motor when a circular-arc-shape recess is added to the bottom 841 of the rectangular dedendum of the inner stator's radial toothlet. Basically, all of the assembly methods are completely the same as the assembly of the inner stator/outer rotor motor of the invention if the circular-arc-shape recess is not added to the rectangular dedendum of the inner stator's radial toothlet. FIG. 9A-1A, FIG. 9A-2A, and FIG. 9A-3A are the diagrams that shows the contact surface 831 of the main body of the stator to the bottom of the radial toothlet's rectangular dedendum changing from linear shape to a circular-arc-shape recess. FIG. 9B-1A is the diagrams that shows the contact surface 941 of the bottom of the radial toothlet's rectangular dedendum to the main body of the stator changing from linear shape to a circular-arc-shape recess.

FIG. 8BB is a modified diagram of FIG. 8 that shows the change of the bottom 541 of the rectangular dedendum of the radial toothlet from linear shape to a V-shape recess for single positioning pin connecting method. FIG. 9AB is a modified diagram of FIG. 9A that shows the change of the contact surface 831 of the main body of the stator to the bottom of the radial toothlet's rectangular dedendum from linear shape to a V-shape recess for single positioning pin connecting method. FIG. 9BB is a modified diagram of FIG. 9B that shows the changes of the contact surface 941 of the bottom of the radial toothlet's rectangular dedendum to the main body of the stator from linear shape to a V-shape recess for single positioning pin connecting method. FIG. 8-1B, FIG. 8-2B, and FIG. 8-3B are the assembling diagrams of the assembling type inner stator/outer rotor motor when a V-shape recess is added to the bottom 841 of the rectangular dedendum of the inner stator's radial toothlet. All of the assembly methods are completely the same as the assembly of the inner stator/outer rotor motor of the invention if the V-shape recess is not added to the rectangular dedendum of the stator's radial toothlet. FIG. 9A-1B, FIG. 9A-2B, and FIG. 9A-3B are the diagrams that shows the change of the contact surface 831 of the main body of the stator to the rectangular dedendum of the radial toothlet from linear shape to a V-shape recess. FIG. 9B-1B is the diagram that shows the change of the contact surface 941 of the rectangular dedendum of the radial toothlet to the main body of the stator from linear shape to a V-shape recess.

As for the contact surfaces of the rectangular dedendum of the inner stator's toothlet and the main body of the stator, no matter whether it is a V-shape or circular arc shape protuberance, or any other shape of protuberance that does not prevent each radial toothlet from being pushed and tightly fitted into the main body of the stator in radial direction, the principle is similar to the previously description of adding V-shape or circular-arc-shape recess, and shall not be repeated here.

Shunt Brush Motor

AS shown in FIG. 13~FIG. 15-5, when the assembling type stator structure of the invention is applied in shunt motors, the assembling type stator structure includes an main body 101 of the outer stator, or a plurality of disassembled small main bodies 105 of the outer stator. Each of the small main body 105 of the outer stator has a plurality of scoop channels. The assembly of the main body of the outer stator can be done by use of one of the following four connecting methods: single positioning pin, double positioning pins, single groove-and-tongue, and double positioning groove-and-tongue.

A plurality of disassembled radial toothlets 102, include a addendum and a dedendum, the disassembled radial toothlets are constructed by punching and stacking up a plurality of permeable silicon steel sheets. Each of the toothlets has configuration and size matching those of the scoop channels so that the toothlet can be inserted and tightly fitted into the scoop channel. Each of the two corners of the dedendum has a chamfer to facilitate insertion into the main body of the stator. The assembly of the assembling type stator can be done by connecting the disassembled radial toothlets to the main body of the stator with one of the following four methods: single positioning pin, double positioning pins, single groove-and-tongue, and double groove-and-tongue. Moreover, the assembling type stator of the shunt motor includes a plurality of positioning pins 102 for positioning and a plurality of bobbins 104 made of insulated material for fitting a plurality of toothlet for winding.

The primary effectiveness of the assembling type stator structure for shunt motors is its low manufacturing cost when applied in single tooth winding because the operation mechanism required for the winding machine is simple and the production is very fast and the manufacturing cost is low.

There can be a large number of assembling sets. This is because that every small main body of the outer stator and the disassembled radial toothlet can be assembled to each other to construct an assembling type of stator structure with one of the following connecting methods: single positioning pin, double positioning pins, single groove and tongue, and double groove-and-tongue. FIG. 14, FIG. 14-1, FIG. 14-2, FIG. 14-3, FIG. 14-4, and FIG. 14-5 are the cross-sectional views of various assembling methods of the assembling type stator structure applied in the outer stator of shunt bipole outer stator brush motors.

FIG. 15, FIG. 15-1, FIG. 15-2, FIG. 15-3, FIG. 15-4, and FIG. 15-5 are the cross-sectional views of various assembling methods of the assembling type stator structure applied in quadri-pole outer stator shunt brush motor of the invention. Other assembling methods are possible and it is not be necessary to give further descriptions.

While the invention has been described by way of example and in terms of the preferred embodiment, it is to be understood that the invention is not restricted to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An assembling type stator structure of motors comprising:
    a main body of the stator having a plurality of scoop channels and at least one semi-circular recess on a side of each scoop channel;
    a plurality of positioning pins for positioning;
    a plurality of disassembled radial toothlets having an addendum and a dedendum constructed by punching and stacking up a plurality of permeable silicon steel sheets, a top end of the addendum is a circular arc surface and an air gap is kept from a corresponding rotor, the dedendum of each toothlet matches a configuration and size of the scoop channel of the main body of the stator to be inserted and tightly fitted into the scoop channel, each dedendum has at least one semi-circular recess on a side thereof and each of the two corners of the dedendum has a chamfer to facilitate insertion into the main body of the stator; the dedendum of each disassembled radial toothlet is inserted into each scoop channel to assemble the assembling type stator, one of the plurality of positioning pins inserted into each semi-circular recess of each of the dedendum of each of the plurality of disassembled radial toothlets; and
    a plurality of bobbins made of insulated material for bushing a plurality of toothlets for winding.

2. An assembling type stator structure of motors as claimed in claim 1, wherein the stator structure is applicable to outer stator/inner rotor motors.

3. An assembling type stator structure of motors as claimed in claim 1, wherein the stator structure is applicable to inner stator/outer rotor motors.

4. An assembling type stator structure of motors as claimed in claim 1, wherein the stator structure is applicable to shunt motors.

5. An assembling type stator structure of motors as claimed in claim 1, wherein the at least one semi-circular recess of the dedendum includes two semi-circular recesses, each of two opposing sides of each dedendum having a semi-circular recess, the at least one semi-circular recess of each of the plurality of scoop channels includes two semi-circular recesses on opposing sides thereof.

6. An assembling type stator structure of motors as claimed in claim 1, wherein the contact surface of the dedendum of the disassembled radial toothlet of the stator to the main body of the stator has a shape selected from the group consisting of a linear shape, a V shape, and a circular arch shape.

* * * * *